US00RE40446E

(19) United States
(12) Reissued Patent
Ichihashi et al.

(10) Patent Number: US RE40,446 E
(45) Date of Reissued Patent: Aug. 5, 2008

(54) STRENGTH-ENHANCING APPARATUS FOR METAL PART

(75) Inventors: Satoru Ichihashi, Saitama (JP); Yutaka Ito, Tochgi (JP); Masaichi Ohno, Tochigi (JP); Shigeru Watanabe, Saitama (JP)

(73) Assignee: Honda Giken Kogyo Kabushiki Kaisha, Tokyo (JP)

(21) Appl. No.: 10/368,603

(22) Filed: Feb. 20, 2003

Related U.S. Patent Documents

Reissue of:
(64) Patent No.: 6,189,355
Issued: Feb. 20, 2001
Appl. No.: 09/362,406
Filed: Jul. 28, 1999

(30) Foreign Application Priority Data

| | | |
|---|---|---|
| Jul. 28, 1998 | (JP) | 10-213272 |
| Jul. 28, 1998 | (JP) | 10-213289 |
| Jul. 28, 1998 | (JP) | 10-213291 |
| Jul. 28, 1998 | (JP) | 10-213294 |
| Apr. 23, 1999 | (JP) | 11-116808 |
| Apr. 23, 1999 | (JP) | 11-116816 |

(51) Int. Cl.
*C21D 7/06* (2006.01)
*B21D 53/10* (2006.01)

(52) U.S. Cl. ..... 72/53; 451/38; 29/90.7
(58) Field of Classification Search ..... 72/53; 29/90.7; 451/38, 39, 40, 75
See application file for complete search history.

(56) References Cited

U.S. PATENT DOCUMENTS

| | | | | | |
|---|---|---|---|---|---|
| 2,982,007 | A | * | 5/1961 | Fuchs et al. | 72/53 |
| 3,199,171 | A | * | 8/1965 | Hellmann | 72/53 |
| 3,276,234 | A | * | 10/1966 | Physioc, III | 72/53 |
| 3,383,803 | A | * | 5/1968 | Schulte et al. | 72/53 |
| 3,423,976 | A | * | 1/1969 | Burney et al. | 72/53 |
| 3,475,936 | A | * | 11/1969 | Steele | 72/53 |
| 3,566,644 | A | * | 3/1971 | Moore | 72/53 |
| 4,753,094 | A | * | 6/1988 | Spears | 72/53 |
| 5,272,897 | A | * | 12/1993 | Wern | 72/53 |
| 6,038,900 | A | * | 3/2000 | Miyasaka | 72/53 |

FOREIGN PATENT DOCUMENTS

| | | | |
|---|---|---|---|
| DE | 19531665 | * | 3/1997 |
| EP | 0144237 | * | 6/1985 |
| GB | 2318077 | * | 4/1998 |
| JP | 50-2294 | | 1/1975 |
| JP | 50-38874 | | 4/1975 |
| JP | 54-23062 | | 2/1979 |
| JP | 61-64901 U | | 5/1986 |
| JP | 63-86902 U | | 6/1988 |
| JP | 2167664 | | 6/1990 |
| JP | 3-102215 U | | 10/1991 |
| JP | 4-101775 A | | 4/1992 |
| JP | 521711 | * | 3/1993 |

(Continued)

OTHER PUBLICATIONS

Partial English Translation of JP–50–3887 (Published Apr. 22, 1975).*

*Primary Examiner*—David B Jones
(74) *Attorney, Agent, or Firm*—Birch, Stewart, Kolasch & Birch, LLP

(57) ABSTRACT

Disclosed is a strength-enhancing apparatus for a metal part comprising a recovery mechanism for sucking powder flow dust generated from glass beads crushed on a surface of a gear in a chamber to recover it together with drainage, wherein the recovery mechanism includes a liquid-spouting means arranged on a ceiling in the chamber, for effecting showering for the whole interior of the chamber. Accordingly, it is possible to reliably recover the mist containing the powder flow dust floating in the chamber, and it is possible to reliably avoid adhesion and accumulation of the powder flow dust.

29 Claims, 33 Drawing Sheets

FOREIGN PATENT DOCUMENTS

| | | | | |
|---|---|---|---|---|
| JP | 6-312371 | A | | 11/1994 |
| JP | 07-148665 | | | 6/1995 |
| JP | 08-103620 | A | | 4/1996 |
| JP | 9248761 | | * | 9/1997 |
| JP | 09248761 | | * | 9/1997 |
| JP | 09248765 | | * | 9/1997 |
| JP | 09-248765 | A | | 9/1997 |
| JP | 9248765 | | * | 9/1997 |
| JP | 10-058327 | A | | 3/1998 |

* cited by examiner

STRENGTH-ENHANCING APPARATUS FOR METAL PART

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a strength-enhancing apparatus for a metal part for enhancing the surface strength of the metal part.

2. Description of the Related Art

In general, the gear repeatedly receives the load when it is used. Therefore, it is necessary to enhance the fatigue strength of the gear surface. For this purpose, the shot peening has been hitherto widely performed to give the compressive residual stress, for example, by allowing steel balls to make collision against the gear surface.

However, the shot peening is inconvenient in that the gear surface becomes rough, and the surface roughness is deteriorated, because the steel balls are used as the shot material in the shot peening. In view of this point, as disclosed in Japanese Patent Publication No. 5-21711, a strength-enhancing method for the metal surface is known, in which a metal formed product is subjected to surface hardening, followed by grinding for the metal surface, and then glass beads having a grain diameter of 0.2 mm to 0.6 mm are impelled or projected thereagainst. Accordingly, it is intended to prevent the metal surface from being rough so that the fatigue strength is improved.

However, the conventional technique described above involves the following problems. That is, the given compressive residual stress is lowered, and it is impossible to improve and increase the fatigue strength up to a desired value. Further, the directivity of the projected glass beads is poor. Therefore, the glass beads are scattered in various directions, and consequently the efficiency is extremely lowered.

The present applicant has suggested a strength-enhancing apparatus for a gear which makes it possible to give a sufficient compressive residual stress and obtain a smooth surface over an area ranging from the tooth surface to the tooth root. A patent application has been filed therefor (see Japanese Laid-Open Patent Publication No. 9-248761). In this prior art, there are provided a gear-holding mechanism for positioning and holding, in a chamber, a gear after being subjected to a heat treatment, an impelling mechanism for impelling or projecting a spouting stream of glass beads and liquid from a nozzle toward a gear surface, a liquid supply mechanism for supplying the liquid to the impelling mechanism under a pressure, and a glass bead supply mechanism for successively feeding a predetermined amount of the glass beads to the impelling mechanism. Accordingly, the glass beads correctly collide against the gear surface while maintaining the directivity. A desired compressive residual stress is given to the gear surface. Further, a smooth surface is obtained over an area ranging from the tooth surface to the tooth root of the gear surface as the glass beads are crushed.

The glass beads collide against the gear surface as the metal surface, and they are crushed. Therefore, the glass bead dust (hereinafter referred to as "powder flow dust" as well) in a micron order floats in the processing chamber. However, the gear, which is subjected to the treatment, is rotated at a high speed while being installed to a spindle. Therefore, the following problems occur. That is, the minute powder flow dust tends to adhere to the spindle rotating at the high speed. The spindle suffers an inconvenience such as rotation defect.

In view of the above, a structure is usually known and used, in which water is jetted or spouted toward the portion at which the powder flow dust causes adhesion and accumulation in the processing chamber so that the powder flow dust is removed therefrom. However, the mist containing the powder flow dust floats in the processing chamber. Such a structure fails to effectively remove the mist. Therefore, a problem is pointed out in that it is impossible to reliably dissolve the adhesion and accumulation of the powder flow dust.

Further, the powder flow dust as described above tends to leak from the processing chamber to the outside, because the dust is extremely minute. Various problems arise, for example, concerning the maintenance of the apparatus and the environment around the apparatus. Furthermore, a large noise is generated when the spouting stream of the glass beads and the liquid is projected onto the metal surface. A problem is also pointed out concerning the noise control.

In the gear-holding mechanism described above, the gear is installed to the spindle provided for the spindle unit. The gear is rotated integrally with the spindle. However, in the case of such a structure, it is feared that any deflection occurs in the gear during the rotation, for example, when a lengthy gear such as a counter shaft is used. Therefore, the following problem is pointed out. That is, it is impossible to correctly project the spouting stream of the glass beads and the liquid toward the gear surface, and it is difficult to apply the highly accurate strength-enhancing treatment to the gear.

On the other hand, the present applicant has suggested a strength-enhancing apparatus for a gear which makes it possible to give a sufficient compressive residual stress and obtain a smooth surface over an area ranging from the tooth surface to the tooth root, and which makes it possible to reliably remove the minute glass bead dust. A patent application has been filed therefor (see Japanese Laid-Open Patent Publication No. 9-248765).

In this prior art, there are provided an impelling mechanism for impelling or projecting, in a chamber, a spouting stream of glass beads and liquid from a nozzle toward a gear surface after being subjected to a heat treatment, and a recovery mechanism for sucking and recovering powder flow dust generated from the glass beads crushed on the gear surface. The recovery mechanism includes a suction port which faces the inside of the chamber and which is arranged in the vicinity of the gear. Accordingly, the glass beads correctly collide against the gear surface while maintaining the directivity. A desired compressive residual stress is given to the gear surface. Further, the minute powder flow dust, which is generated as the glass beads are crushed, is reliably sucked and recovered from the suction port.

The recovery mechanism described above is used such that the mist containing the powder flow dust floating in the chamber is sucked and discarded. However, when the strength-enhancing treatment is continuously performed for the gear, the amount of discarded drainage arrives at a considerable amount. For this reason, it is difficult to reliably remove the powder flow dust from the inside of the chamber. Further, the powder flow dust, which is contained in the drainage, can be used to produce the glass beads. On the other hand, the liquid can be recycled as the washing water to be used in the chamber.

SUMMARY OF THE INVENTION

A general object of the present invention is to provide a strength-enhancing apparatus for a metal part, which makes it possible to reliably recover the mist containing the powder flow dust floating in the chamber, and effectively avoid adhesion and accumulation of the powder flow dust.

A principal object of the present invention is to provide a strength-enhancing apparatus for a metal part, which is excellent in noise control performance and operability in which the mist containing the powder flow dust floating in the chamber does not leak to the outside.

Another principal object of the present invention is to provide a strength-enhancing apparatus for a metal part, which makes it possible to reliably hold various types of metal parts having different shaft lengths, and accurately apply the strength-enhancing treatment to the metal part.

Still another principal object of the present invention is to provide a strength-enhancing apparatus for a metal part, which makes it possible to economically and efficiently process the drainage containing the powder flow dust generated when glass beads are crushed, in order to effectively utilize the resource of this type.

Still another principle object of the present invention is to provide a strength-enhancing apparatus for a metal part, which makes it possible to efficiently and reliably process the drainage containing the powder flow dust generated when glass beads are crushed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
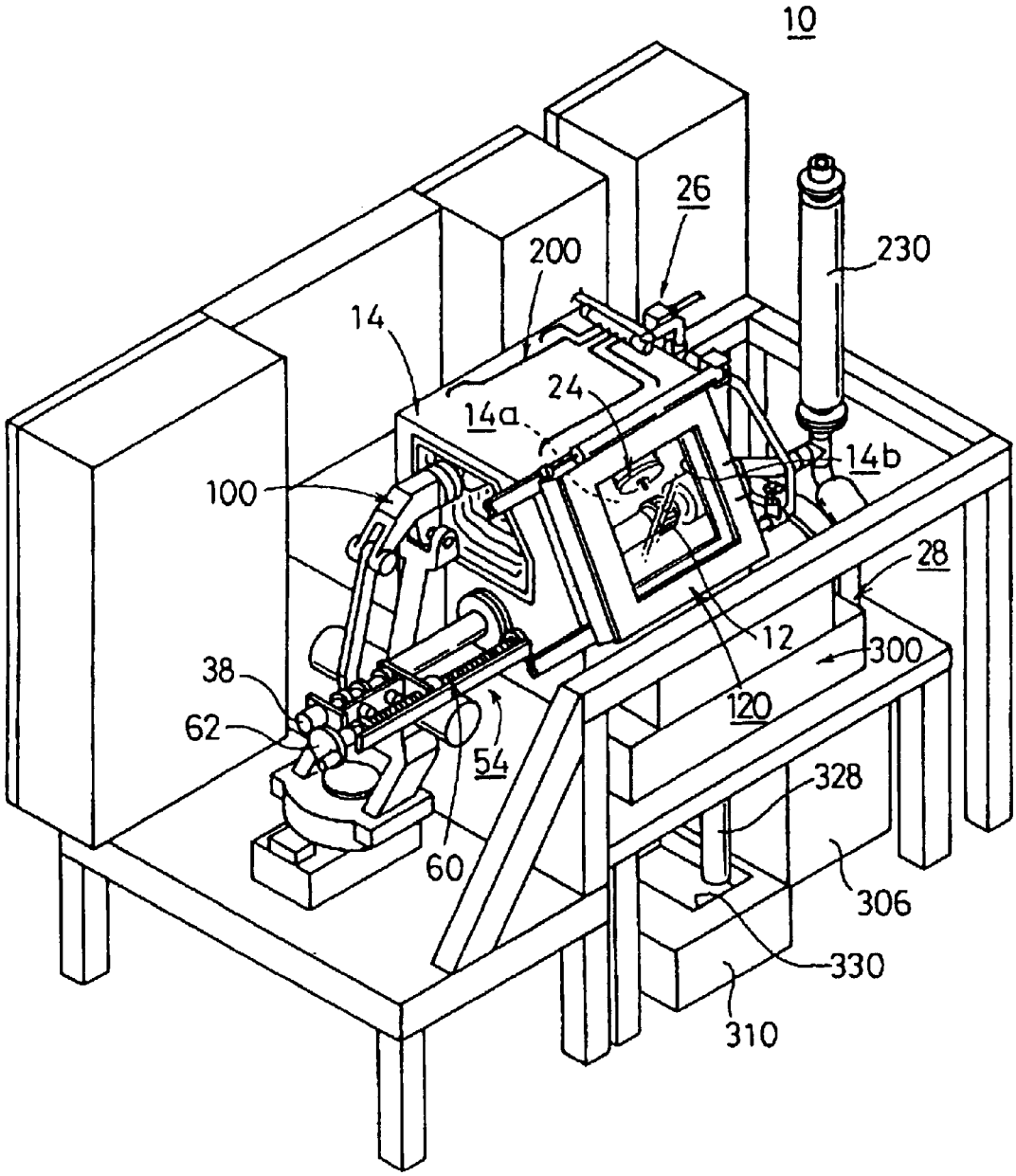
FIG. 1 shows a schematic perspective view illustrating a strength-enhancing apparatus for a gear according to a first embodiment of the present invention.
Figure 2:
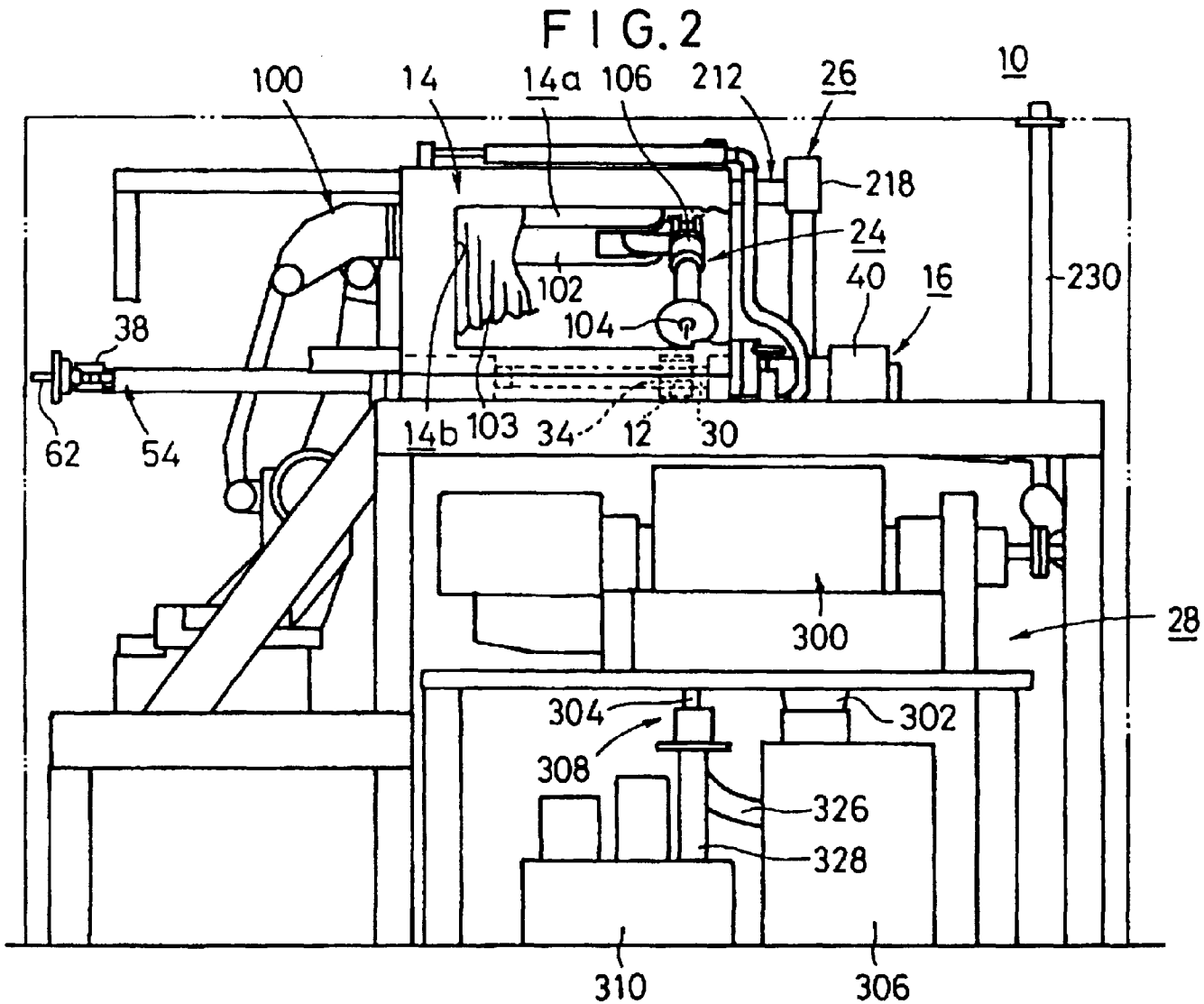
FIG. 2 shows front view illustrating the strength-enhancing apparatus.
Figure 3:
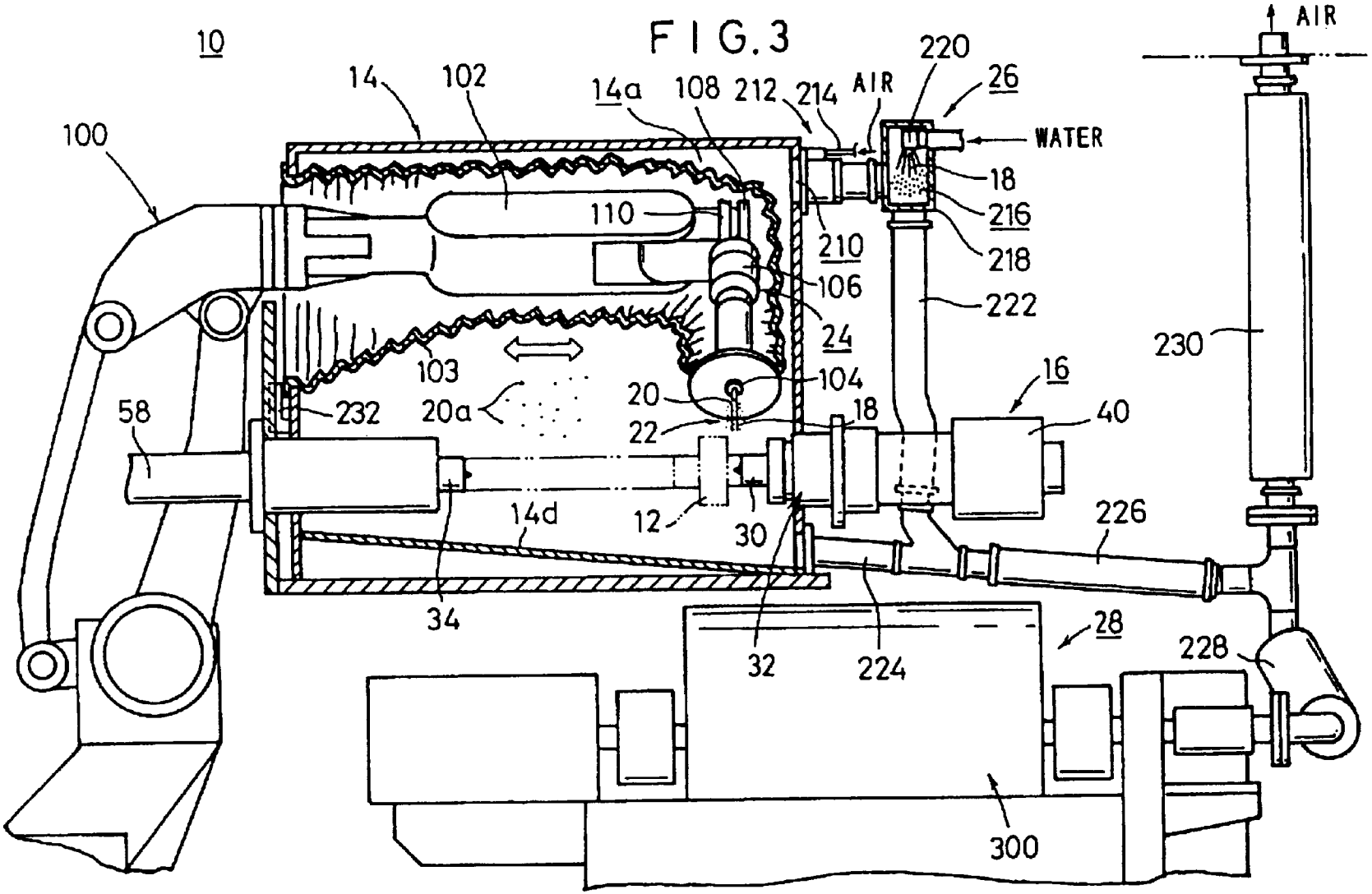
FIG. 3 shows magnified sectional front view illustrating upper portion of the strength-enhancing apparatus.

FIG. 1 shows a schematic perspective view illustrating a strength-enhancing apparatus 10 for a metal part according to a first embodiment of the present invention. FIG. 2 shows a front view illustrating the strength-enhancing apparatus 10. FIG. 3 shows a magnified sectional front view illustrating an upper portion of the strength-enhancing apparatus 10.

The strength-enhancing apparatus 10 comprises a metal part-holding mechanism 16 for holding a metal part to be processed, for example, a gear 12 so that the gear 12 is positioned and held in a chamber (processing chamber) 14a in a casing 14, a projecting mechanism 24 for projecting a spouting stream 22 of liquid such as water 18 and glass beads 20 toward the gear 12, a recovery mechanism 26 for sucking powder flow dust 20a generated from the glass beads 20 crushed on the surface of the gear 12 so that the powder flow dust 20a is recovered together with drainage, and a classifying mechanism 28 for classifying the recovered drainage into the water 18 and the powder flow dust 20a.

Figure 4:
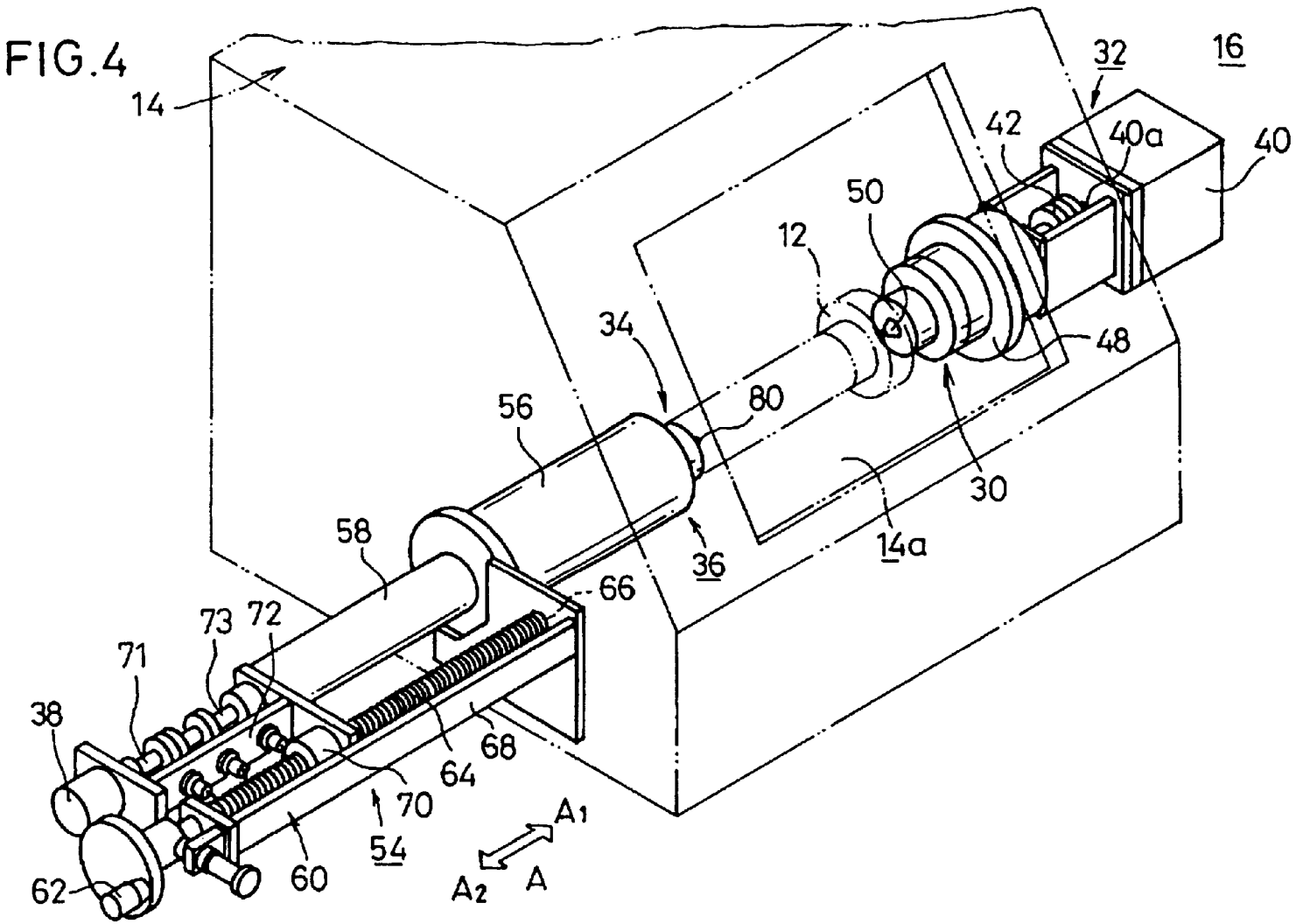
FIG. 4 shows perspective view illustrating a metal part-holding mechanism.

As shown in FIG. 4, the metal part-holding mechanism 16 includes a spindle unit 32 which is provided with a driving rotary section 30 for making rotation while supporting a first end of the gear 12, a support means 36 which is provided with a driven rotary section 34 that is rotatable while supporting a second end of the gear 12, and a cylinder 38 for pressing the driven rotary section 34 toward the second end of the gear 12 so that the gear 12 is interposed by the driven rotary section 34 and the driving rotary section 30.

Figure 5:
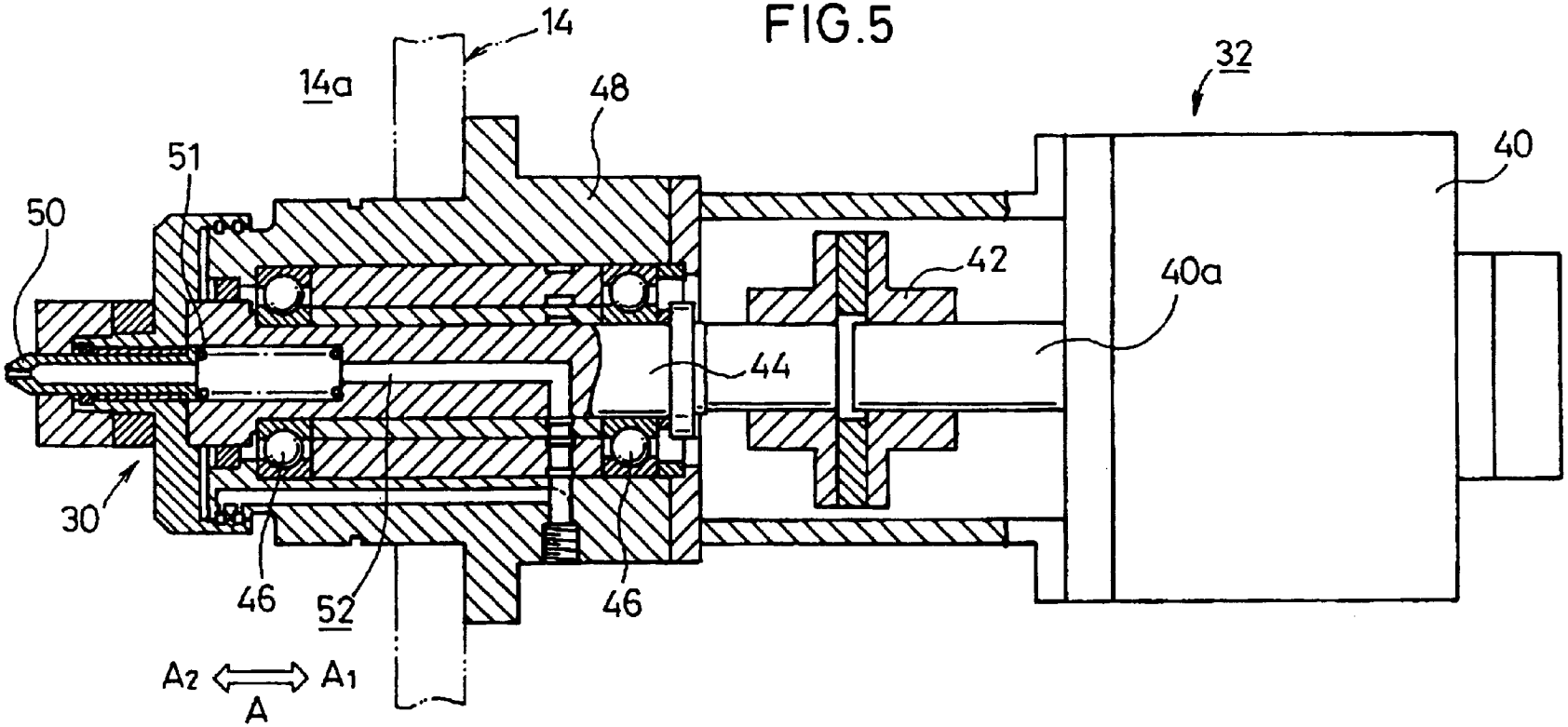
FIG. 5 shows a longitudinal sectional view illustrating the side of a spindle unit for constructing the metal part-holding mechanism.

As shown in FIG. 5, a rotary shaft 40a of a servo motor 40 for constructing the spindle unit 32 is coupled via a coupling 42 to a driving shaft 44 for constructing the driving rotary section 30. The driving shaft 44 is rotatably supported by a cylinder 48 by the aid of a bearing 46. The cylinder 48 is fastened by screws to the casing 14. A first support member 50, which has a substantially columnar configuration provided with a tapered portion, is arranged movably back and forth via a spring 51 at the forward end of the driving shaft 44. An air passage 52 for avoiding invasion of the powder flow dust is formed integrally to penetrate through the first support member 50 and the driving shaft 44. A first end of the air passage 52 is connected to an unillustrated air blower, while a second end of the air passage 52 is open to the outside at the forward end of the first support member 50.

Figure 6:
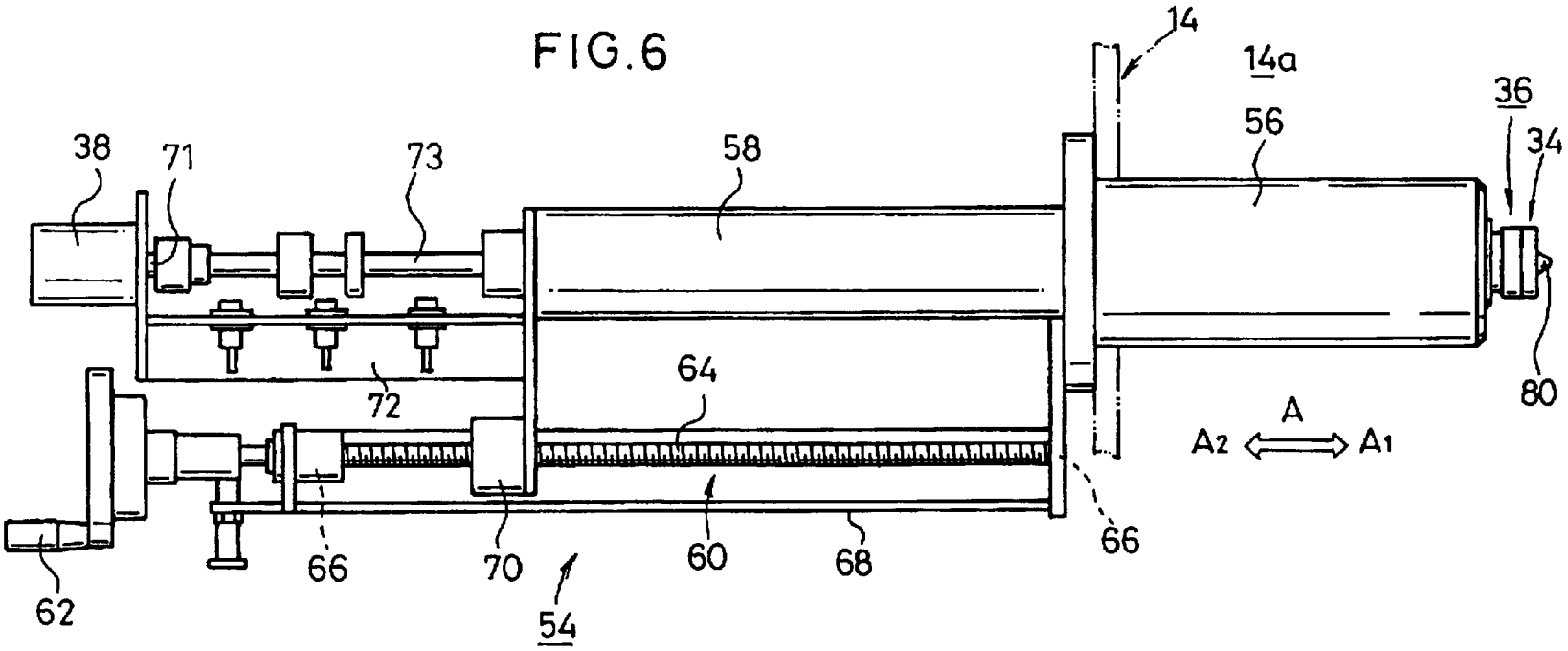
FIG. 6 shows a longitudinal sectional view illustrating the side of a support means for constructing the metal part-holding mechanism.

As shown in FIG. 6, the support means 36 and the cylinder 38 can be subjected to positional adjustment in the axial direction of the gear 12 (direction indicated by the arrow A) by the aid of a position-adjusting means 54. The position-adjusting means 54 includes a substantially cylindrical guide member 56 which is fastened by screws to the casing 14, a sleeve member 58 which is fitted movably back and forth to the inside of the guide member 56 for installing the support member 36 and the cylinder 38 thereto, and a movement means 60 for moving the sleeve member 58 back and forth in the axial direction (direction indicated by the arrow A).

A screw shaft 64 is coupled to a handle 62 for constructing the movement means 60. The screw shaft 64 is supported by an attachment base 68 by the aid of a bearing 66. The attachment base 68 is fixed to the outer wall of the casing 14. A nut member 70 is externally installed to the screw shaft 64. A first end of the sleeve member 58 is fixed to the nut member 70. The cylinder 38 is installed to the first end of the sleeve member 58 by the aid of an attachment member 72. A slide rod 73 is coaxially coupled to a rod 71 which extends in the direction of the arrow A from the cylinder 38.

Figure 7:
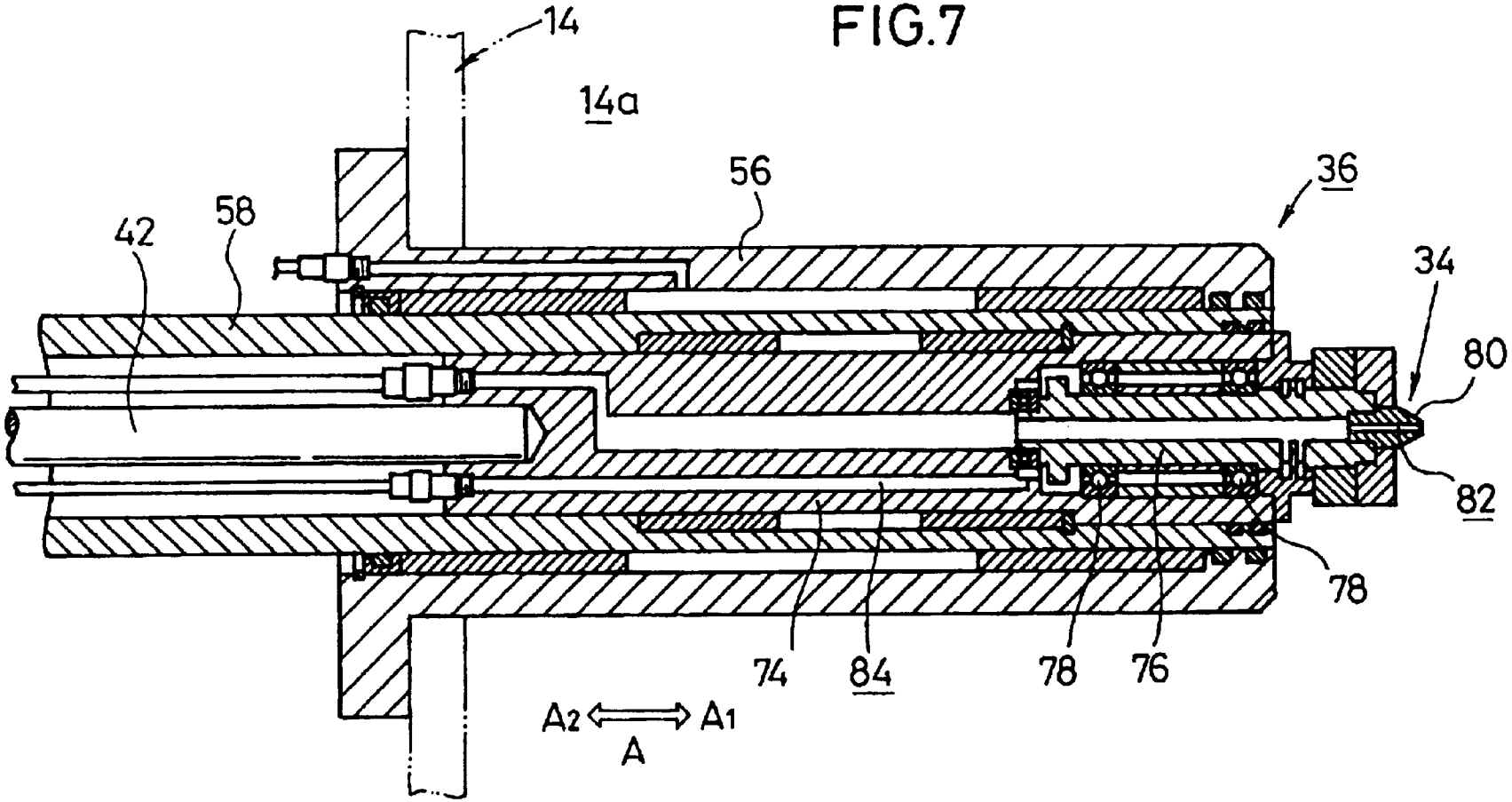
FIG. 7 shows sectional view illustrating a position-adjusting mean or constructing the metal part-holding mechanism.

As shown in FIG. 7, a columnar holding member 74 for constructing the support means 36 is coupled to the forward end of the slide rod 73. The holding member 74 is supported movably back and forth in the sleeve member 58. A driven shaft 76 for constructing the driven rotary section 34 is rotatably supported at the forward end of the holding member 74 by the aid of a bearing 78. A substantially columnar second support member 80, which is provided with a tapered portion, is disposed at the forward end of the driven shaft 76. An air passage 82 for avoiding invasion of the powder flow dust is formed ranging over the holding member 74, the driven shaft 76, and the second support member 80. The air passage 82 is connected to the unillustrated air blower. An air discharge passage 84 is provided in the holding member 74 to avoid invasion of the powder flow dust 20a or the like, for example, into the bearing 78.

As shown in FIGS. 2 and 3, the projecting mechanism 24 includes a robot 100 which is arranged at the outside of the casing 14. An arm section 102 for constructing the robot 100 is arranged in the chamber 14a in the casing 14 in a state of being protected by a bellows member 103. A nozzle 104 is installed to the forward end of the arm section 102. A mixing chamber 106 for mixing the water 18 and the glass beads 20 is coupled to an upper portion of the nozzle 104. The water 18 and the glass beads 20 are supplied from an unillustrated water supply source and a hopper coupled via tube passages 108, 110 respectively (see FIG. 3).

Figure 8:
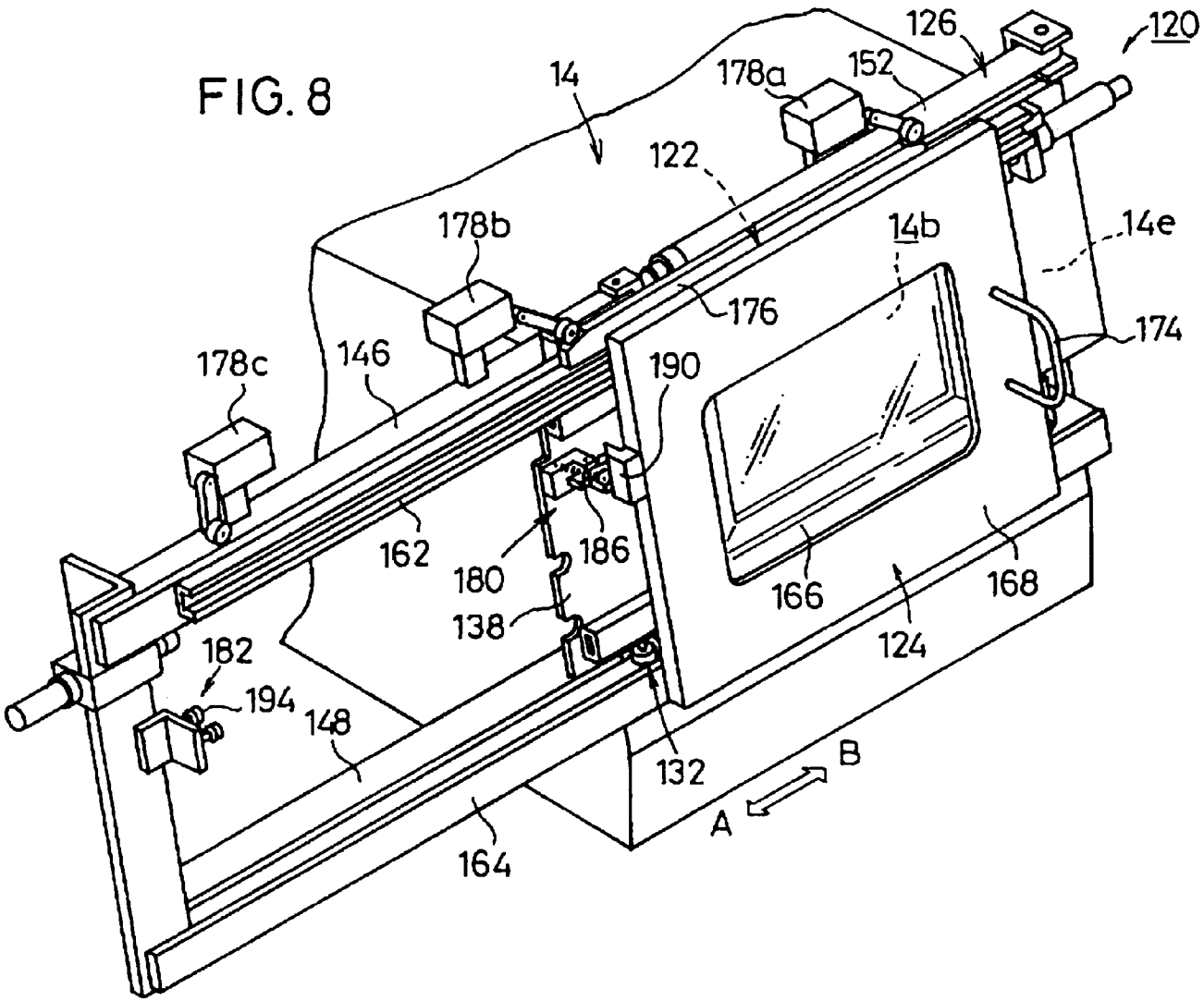
FIG. 8 shows a schematic perspective view illustrating a door structure shown in FIG. 1.
Figure 9:
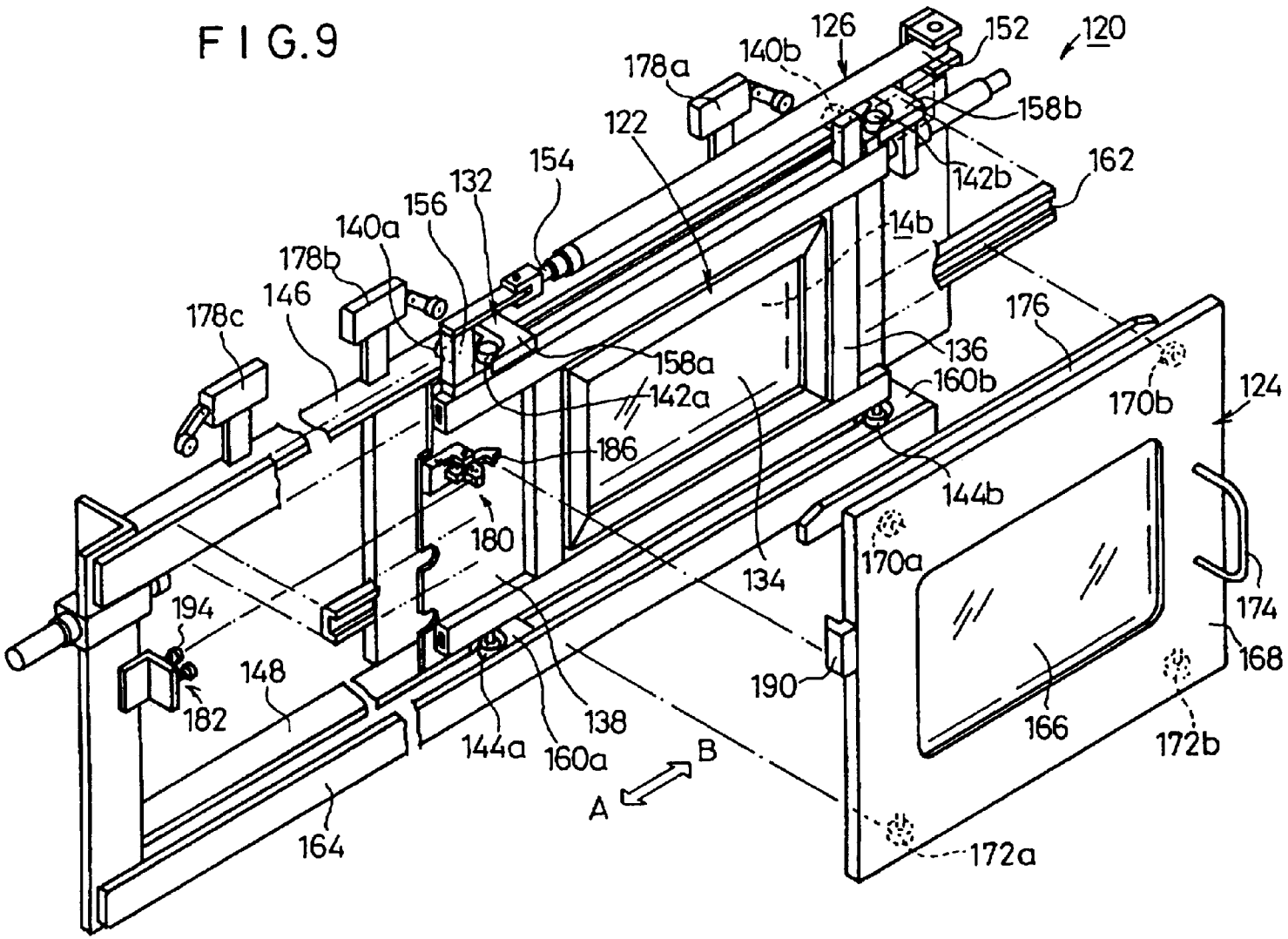
FIG. 9 shows a partially exploded perspective view illustrating the door structure.
Figure 10:
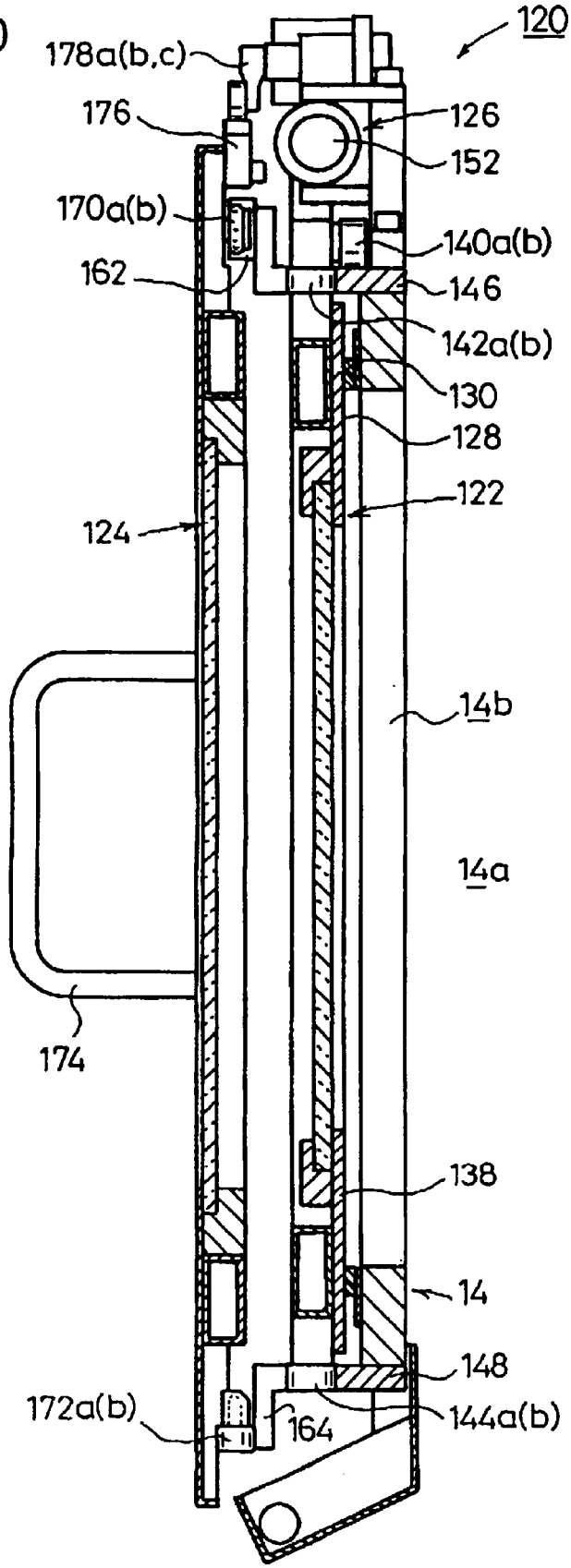
FIG. 10 shows a longitudinal sectional side view illustrating the door structure.

The casing 14 is provided with a door structure 120 for opening/closing the opening 14b of the chamber 14a for attaching/detaching the metal part. As shown in FIGS. 8 to 10, the door structure 120 includes an inner slide door 122 which is arranged on the side of the opening 14b, an outer slide door 124 which is arranged at the outside of the inner slide door 122, a driving means 126 for automatically moving the inner slide door 122 back and forth in the opening/closing direction, and a pressing means 132 for allowing the inner side surface 128 of the inner slide door 122 to make tight contact with the outer wall 130 of the casing 14 for forming the chamber 14a when the inner slide door 122 is closed by the aid of the driving means 126.

The inner slide door 122 includes a frame 136 which is installed with a window glass 124. The frame 136 is attached to an attachment plate 138. Support rollers 140a, 140b which are rotatable about the horizontal axes, and upper rollers 142a, 142b which are rotatable about the vertical axes are provided on the upper side of the attachment plate 138. On the other hand, lower rollers 144a, 144b which are rotatable about the vertical axes are installed on the lower side of the attachment plate 138.

An upper guide 146 and a lower guide 148, which extend in the horizontal direction in parallel to one another, are provided on the inclined outer surface 14e of the casing 14. The upper rollers 142a, 142b and the lower rollers 144a, 144b contact with the upper guide 146 and the lower guide 148 to make rotation thereon. The support rollers 140a, 140b rotatably contact with the upper surface of the upper guide 146.

The driving means 126 includes a cylinder 152 with its first end which is supported by the upper guide 146 in a swingable manner. The attachment plate 138 is fixed via a coupling member 156 to a rod 154 extending from the cylinder 152. The pressing means 132 includes upper rollers 142a, 142b and lower rollers 144a, 144b as cam followers which are installed to the attachment plate 138, and upper plates (cam members) 158a, 158b and lower plates (cam members) 160a, 160b which are fixed on the side of the casing 14 for making contact therewith to retract the inner slide door 122 toward the opening 14b. The casing 14 is provided with an elastic member as the outer wall 130 for surrounding the opening 14b to make tight contact with the inner surface 128 of the inner slide door 122.

An outer upper guide 162 and an outer lower guide 164 are provided on the upper guide 146 and the lower guide 148 respectively. The outer slide door 124 is provided with a frame 168 which is installed with a window glass 166. Upper rollers 170a, 170b for making contact with the outer upper guide 162 to make rotation about the horizontal axes, and lower rollers 172a, 172b for making contact with the outer lower guide 164 to make rotation about the vertical axes are provided on the inner surface side of the frame 168.

A hand section 174 for being directly gripped by an operator is provided on the outer surface side of the outer slide door 124. A dog plate 176 is fixed to an upper portion on the inner side surface of the outer slide door 124. The dog plate 176 ON/OFF operates switches 178a to 178c which are provided on the support guide 150. Thus, the positions of the outer slide door 124, i.e., the closed position, the intermediate movement position, and the open position are automatically detected.

The inner slide door 122 and the outer slide door 124 are provided with an engaging means 180 for engaging the outer slide door 124 with the inner slide door 122 to move the outer slide door 124 in the opening direction when the driving means 126 is used to move the inner slide door 122 in the opening direction (direction indicated by the arrow A). A release means 182 is provided at the open position of the inner slide door 122, for releasing the engagement between the outer slide door 124 and the inner slide door 122 effected by the engaging means 180.

Figure 11:
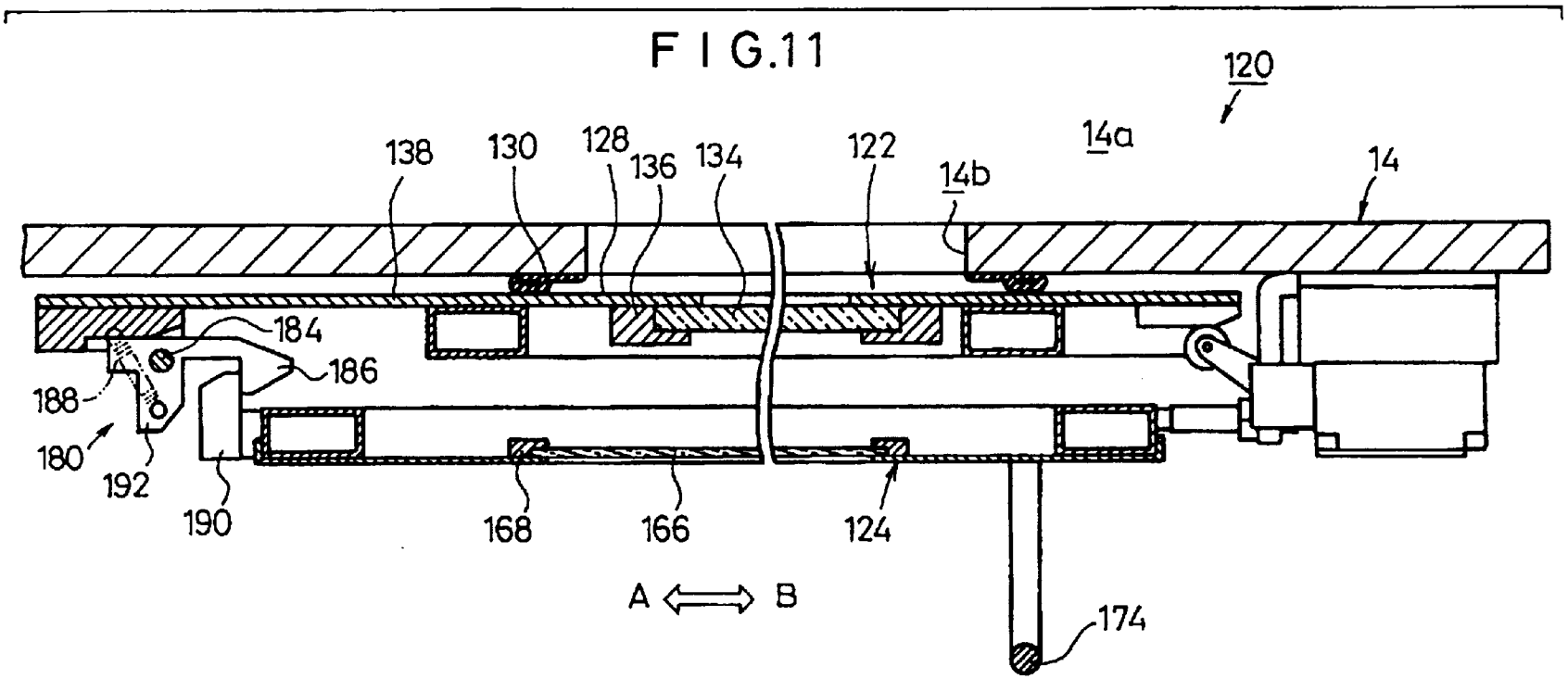
FIG. 11 illustrates an engaging means for constructing the door structure.

As shown in FIGS. 9 and 11, the engaging means 180 includes a pawl member 186 which is swingable about a support point 184 on the attachment plate 138. The pawl member 186 is stretched outwardly by the aid of a spring 188. A projection member 190, which is engageable with the pawl member 186, is fixed to the outer slide door 124. As shown in FIG. 9, the release means 182 is arranged corresponding to an expansion 192 of the pawl member 186. The release means 182 includes a pressing bolt 194 for separating the pawl member 186 from the projection member 190 in a state in which the inner slide door 122 is arranged at the open position.

Figure 12:
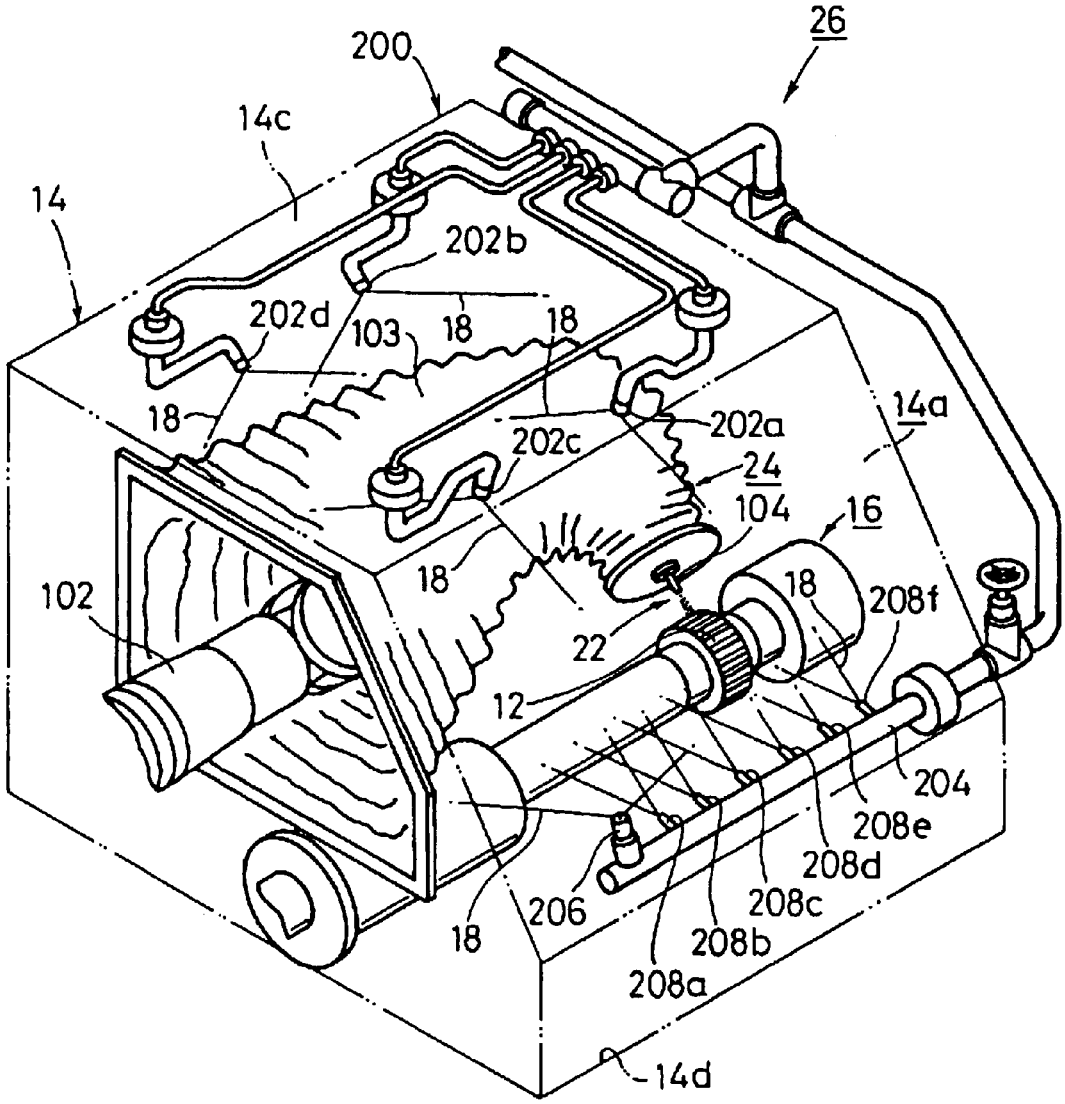
FIG. 12 shows a partial perspective view illustrating a recovery mechanism for constructing the strength-enhancing apparatus.
Figure 13:
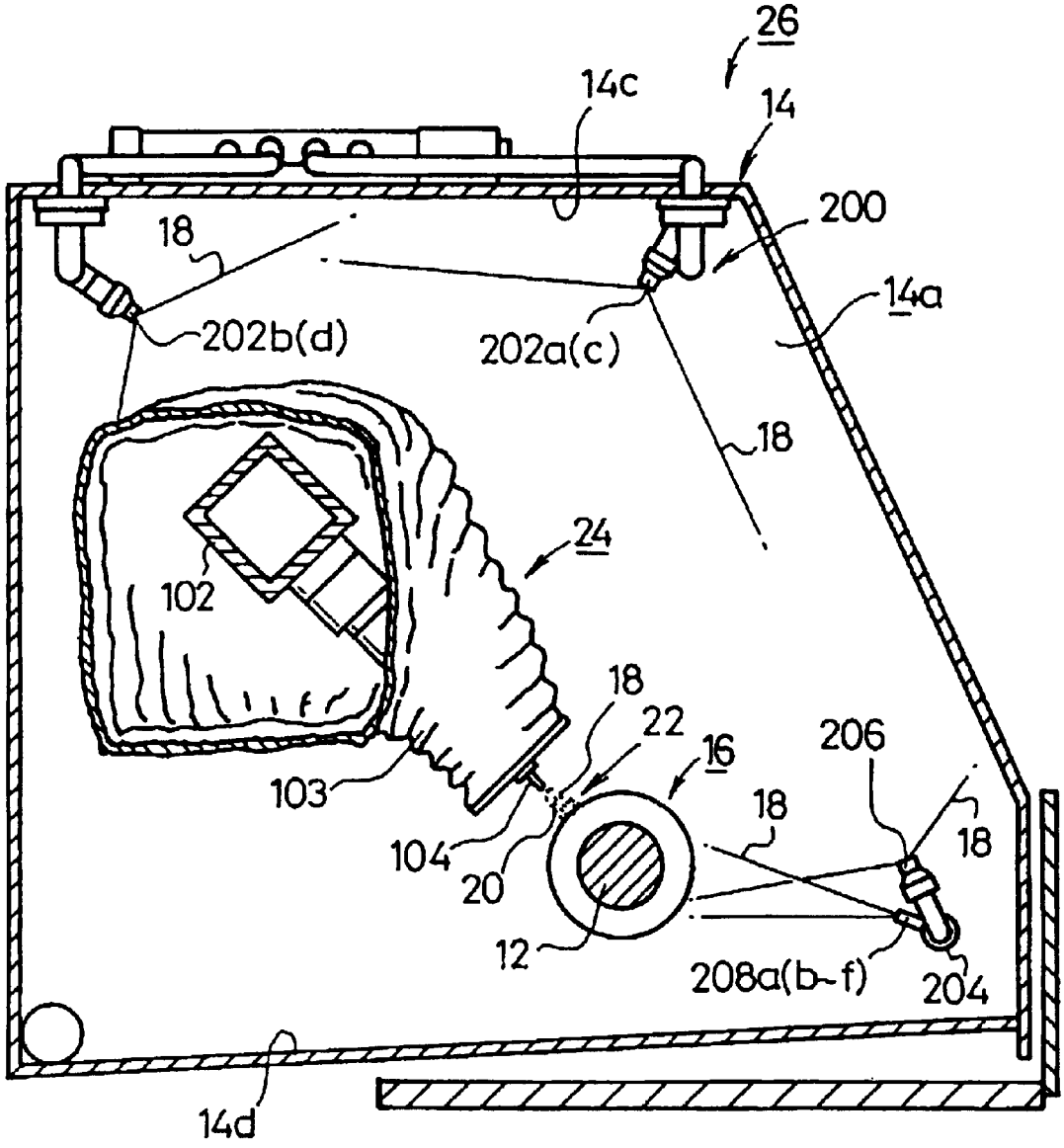
FIG. 13 shows another partial front view illustrating the recovery mechanism shown in FIG. 12.

A liquid-spouting means 200 for constructing the recovery mechanism 26 is arranged in the chamber 14a. As shown in FIGS. 12 and 13, the liquid-spouting means 200 is arranged on the side of the ceiling 14c of the casing 14. The liquid-spouting means 200 is provided with four water-spouting nozzles 202a to 202d for spouting a liquid, for example, the water 18 over wide angles in the chamber 14a. Each of the water-spouting nozzles 202a to 202d is designed for the spouting angle and the direction to make it possible to effect the showering for the whole interior of the chamber 14a.

The bottom 14d of the casing 14 is formed to be inclined toward a certain corner (see FIG. 3). A water pipe 204 is arranged in the close vicinity of the bottom 14d. As shown in FIG. 12, the water pipe 204 is provided with a water-spouting nozzle 206 for spouting the water 18 over a wide angle to wash the lower surface side of the arm section 102 of the robot 100, and nozzles 208a to 208f for washing to the gear.

Figure 14:
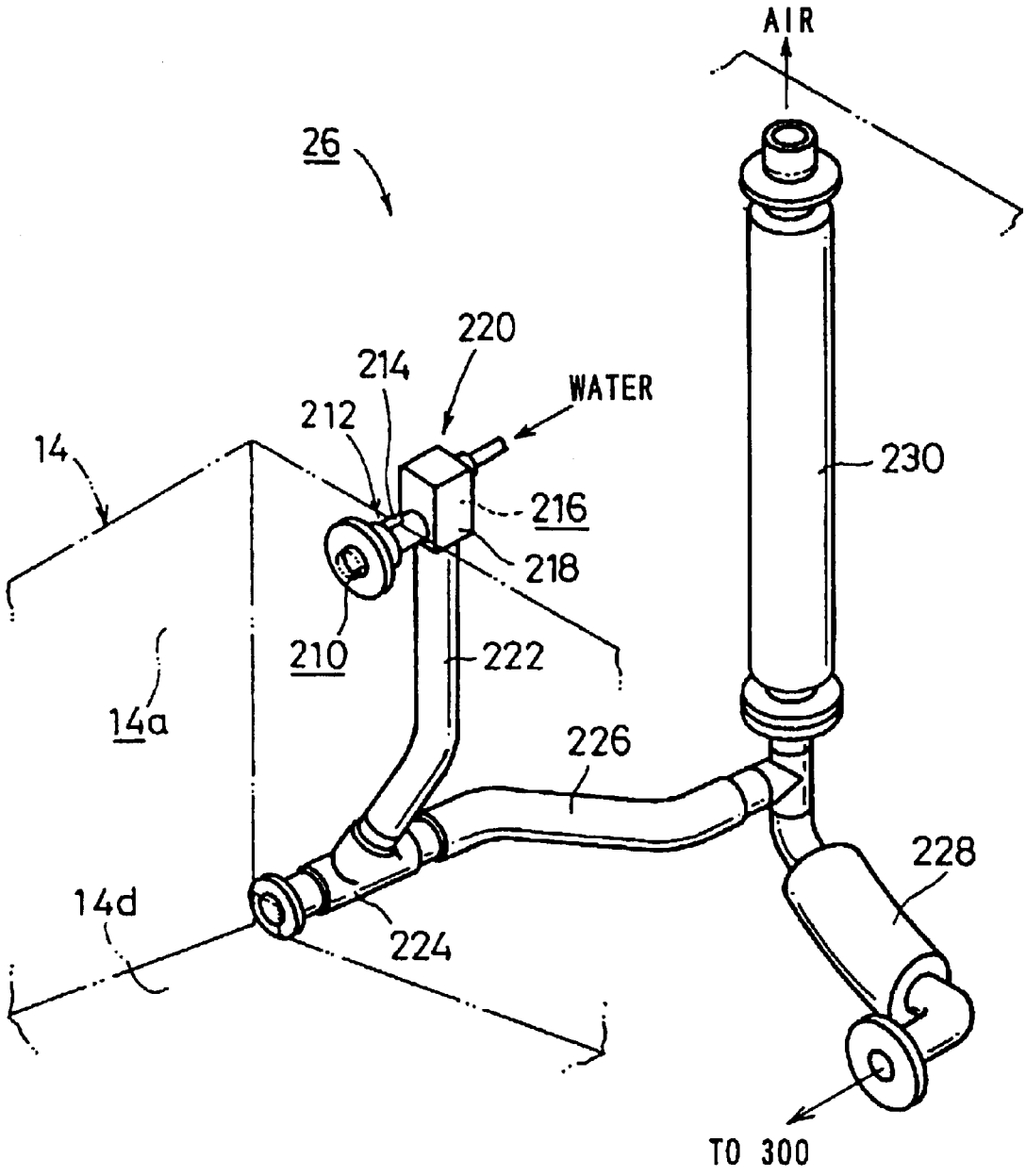
FIG. 14 shows another partial perspective view illustrating recovery mechanism.

As shown in FIGS. 3 and 14, the recovery mechanism 26 includes a suction port 210 which is provided at an upper portion on one side of the casing 14. A negative pressure-generating section 212 is coupled to the suction port 210.

The negative pressure-generating section 212 is provided at its side portion with a compressed air supply port 214 to function such that the interior of the negative pressure-generating section 212 is in a state of being at a negative pressure in accordance with the blowing action of the compressed air introduced from the compressed air supply port 214. A casing 218 for constructing a showering chamber 216 is connected to the negative pressure-generating section 212. A liquid-spouting means 220 is installed in the casing 218. The showering is effected in the chamber 216 by using the water 18 spouted from the liquid-spouting means 220.

A tube 222 is connected to the casing 218. The tube 222 is connected to a joint tube 224 which is connected corresponding to the lowermost position of the bottom 14d of the casing 14. The joint tube 224 is connected via tubes 226, 228 to a centrifugal separator 300 for constructing the classifying mechanism 28. An air tube 230, which is disposed vertically upwardly, is coupled between the tubes 226, 228. An air-introducing tube 232, which is disposed on the side opposite to the suction port 210 and which is positioned on the lower side, is connected to the casing 14 (see FIG. 3).

Figure 15:
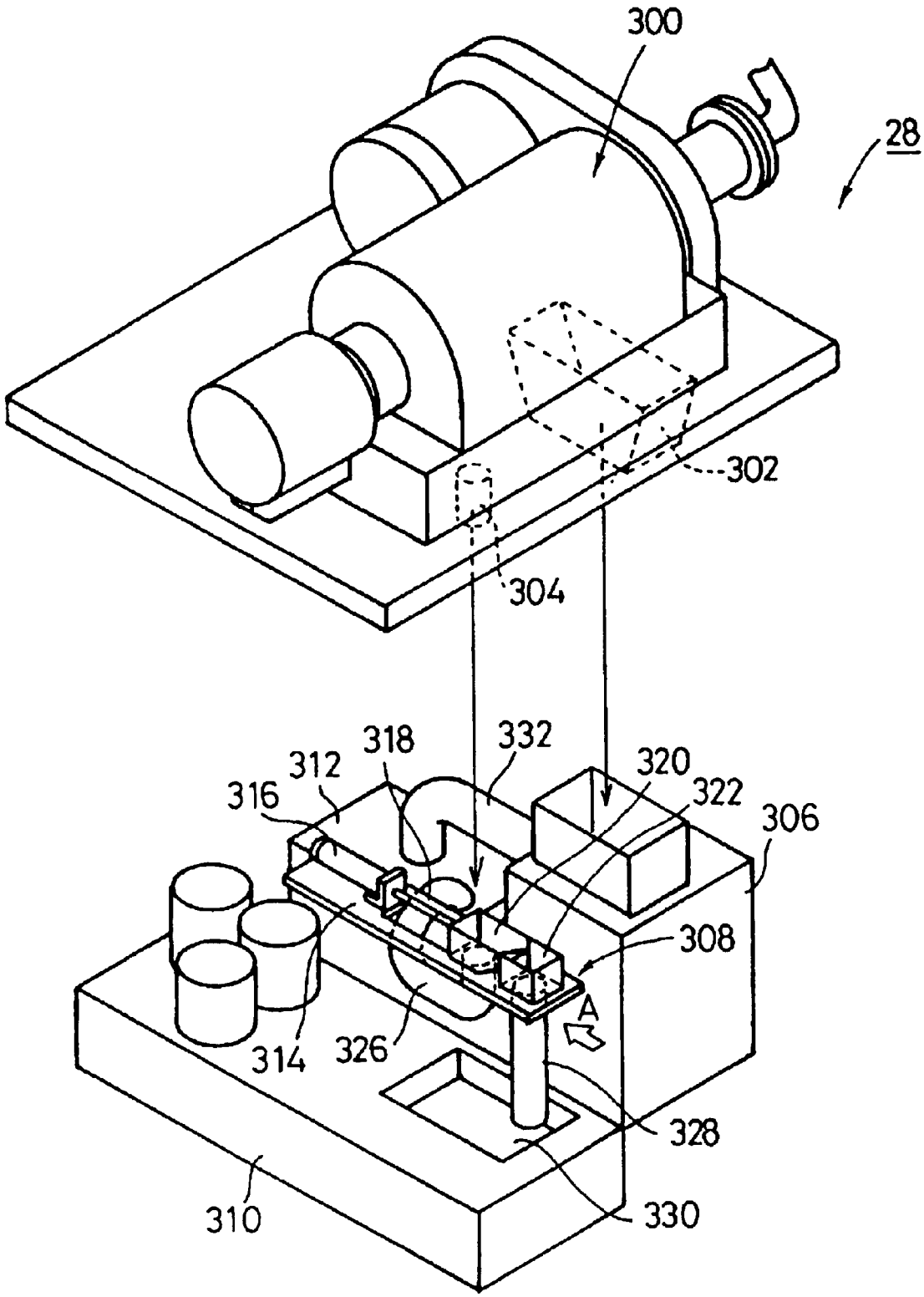
FIG. 15 shows a partial exploded schematic perspective view illustrating classifying mechanism for constructing the strength-enhancing apparatus.

The classifying mechanism 28 is arranged under the casing 14. As shown in FIG. 15, the centrifugal separator 300 for constructing the classifying mechanism 28 is provided with a sludge discharge port 302 for discharging the powder flow dust 20a as the separated solid content, and a liquid discharge port 304 for discharging the water 18 as the separated liquid. A sludge recovery box 306 is arranged under the sludge discharge port 302. On the other hand, a first tank 310 and a second tank 312 are selectively coupled to the liquid discharge port 304 via a switching discharge means 308.

Figure 16:
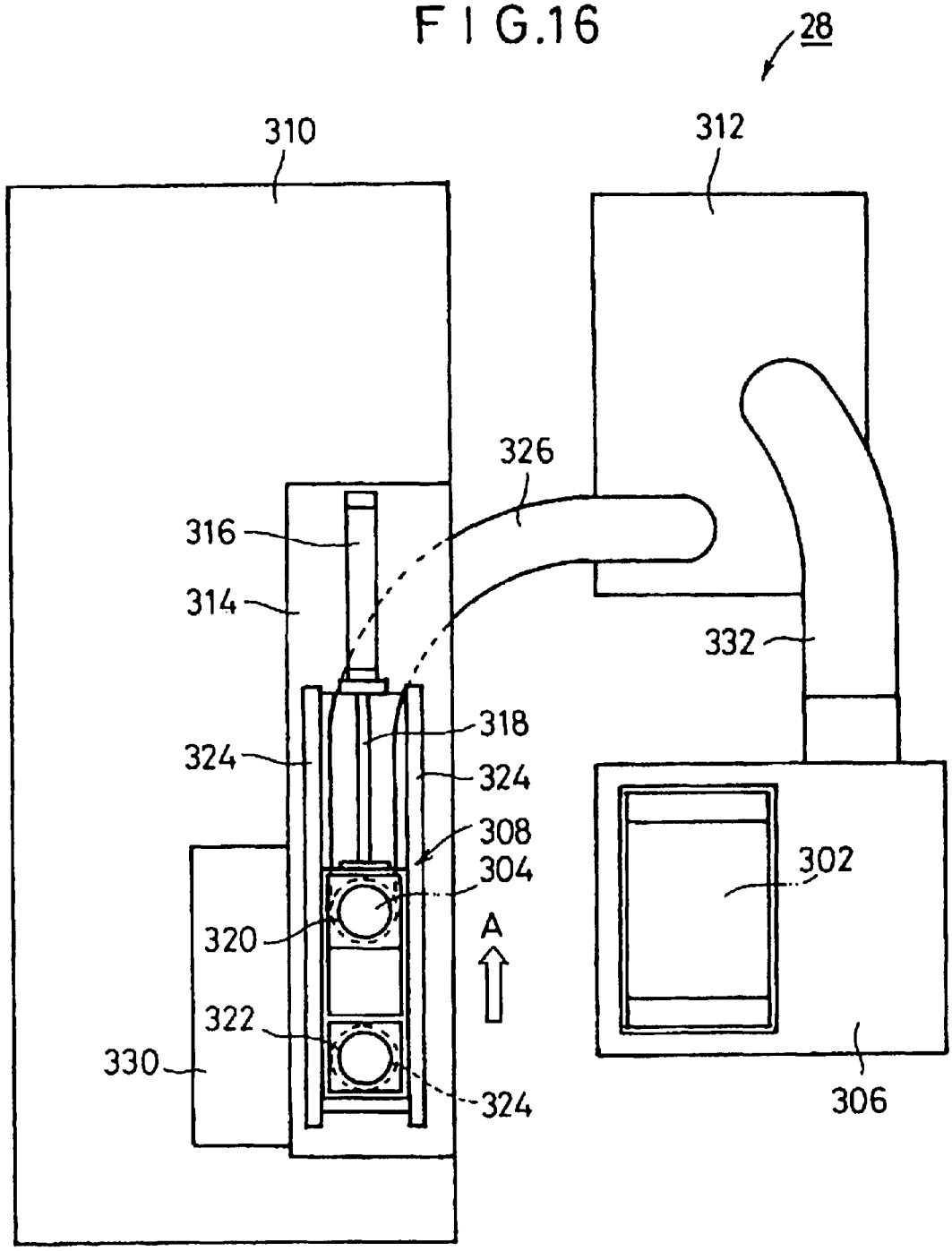
FIG. 16 shows a plan view illustrating the classifying mechanism.

As shown in FIGS. 15 and 16, the first tank 310 is designed to have a relatively large capacity, and it is a tank for storing the water 18 from which the powder flow dust 20a is completely removed. The second tank 312 is a tank for storing the water 18 containing the powder flow dust 20a in a mixed manner, and it is designed to have a capacity smaller than that of the first tank 310.

Figure 17:
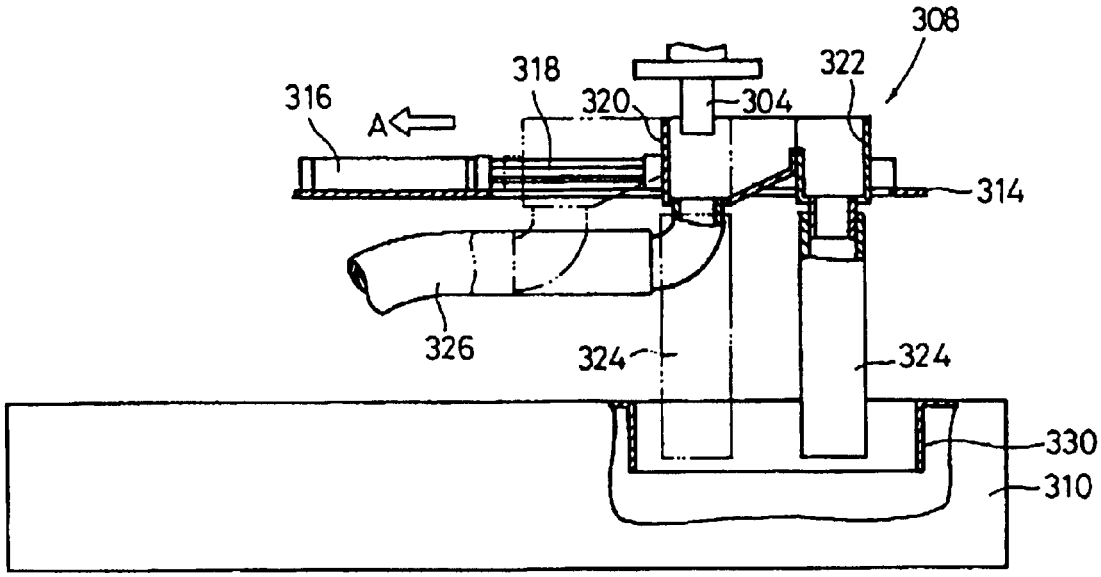
FIG. 17 illustrates the operation of a switching discharge means for constructing the classifying mechanism.

As shown in FIGS. 15 to 17, the switching discharge means 308 includes a cylinder 316 which is provided over the first tank 310 by the aid of an attachment plate 314. A first receiving member 320 and a second receiving member 322 are coupled to a rod 318 which extends in the horizontal direction from the cylinder 316. The first and second receiving members 320, 322 are supported movably back and forth by the aid of a pair of guides 324 provided on the attachment plate 314.

A first end of a first drainage tube 326 is connected to the first receiving member 320. A second end of the first drainage tube 326 is arranged in the second tank 312. A first end of the second drainage tube 328 is connected to the second receiving member 322. A second end of the second drainage tube 328 extends vertically downwardly, and it is arranged in a receiving tank 330 disposed in the first tank 310. The first and second receiving members 320, 322 are selectively arranged at the position corresponding to the liquid drainage port 304 in accordance with the action of the cylinder 316. A discharge tube 322, which is connected to the upper end side of the sludge recovery body 306, is arranged for the second tank 312.

Figure 18:
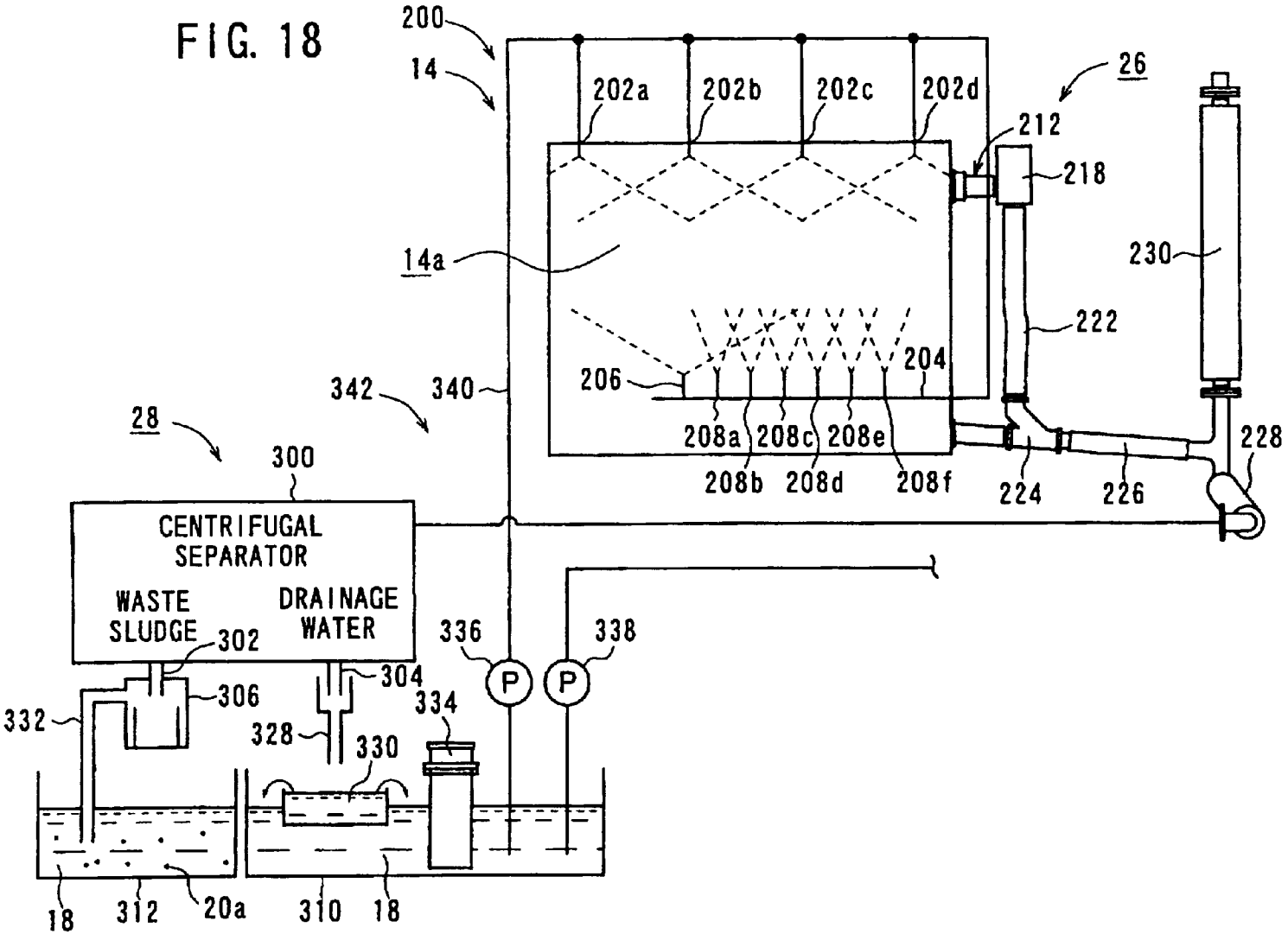
FIG. 18 illustrates a fluid circuit of the strength-enhancing apparatus.

As shown in FIG. 18, a level sensor 334 is provided in the first tank 310. The water level in the first tank 310 is detected at four positions, i.e., the upper limit position, the discharge start position, the discharged stop position, and the lower limit position. A first pump 336 and a second pump 338 are arranged for the first tank 310. The first pump 336 constitutes a supply mechanism 342 for supplying the water 18 in the first tank 310 via a water passage 340 to the liquid-spouting means 200 in the casing 14. The second pump 338 functions to discharge the water 18 in the first tank 310 to the outside.

Explanation will be made below for the operation of the strength-enhancing apparatus 10 constructed as described above.

At first, the carburizing treatment is applied to the gear 12 having been subjected to the toothed wheel cutting by means of the cutting machining. The gear 12 after the carburizing treatment is arranged between the driving rotary section 30 and the driven rotary section 34 which constitute the metal part-holding mechanism 16. The driven rotary section 34 is moved toward the gear 12 (in the direction indicated by the arrow A1) in accordance with the driving action of the cylinder 38 (see FIG. 4). Accordingly, the gear 12 is pressed and interposed at its both ends by the driving rotary section 30 and the driven rotary section 34.

Subsequently, the door structure 120 as a double door is closed, and the opening 14b of the casing 14 is closed. In this state, the servo motor 38, which constitutes the spindle unit 32, is driven to rotate the gear 12 (see FIG. 3). Accordingly, as shown in FIG. 5, the driving shaft 44 is rotated, which is coupled via the coupling 42 to the rotary shaft 40a of the servo motor 40 to integrally rotate and drive the first support member 50 which is provided at the forward end of the driving shaft 44 and the gear 12 which is supported at its first end by the first support member 50. The second end of the gear 12 is supported by the second support member 80 which constitutes the driven rotary section 34. The second support mechanism 80 is rotated integrally with the driven shaft 76 by the aid of the bearing 78 with respect to the holding member 74 (see FIG. 7).

During this process, as shown in FIG. 3, the water 18 and the glass beads 20 are fed under the pressure via the respective tube passages 108, 110 to the mixing chamber 106 in accordance with the action of an unillustrated high pressure pump which constitutes the projecting mechanism 24. Accordingly, the spouting stream 22 of the water 18 and the glass beads 20 is projected while maintaining the directivity from the nozzle 104 to the gear 12.

Further, the nozzle 104 is moved in the predetermined direction, i.e., in the axial direction of the gear 12 by the aid of the arm section 102 which constitutes the robot 100. The compressive residual stress is applied by the glass beads 20 to the entire tooth surface of the gear 12. Simultaneously, the glass beads 20 are crushed. The powder flow dust 20a, which is generated as the glass beads 20 are crushed, floats in the casing 14. The liquid-spouting means 200 and the negative pressure-generating section 212, which constitute the recovery mechanism 26, are operated.

The liquid-spouting means 200 is operated as follows. That is, as shown in FIGS. 12 and 13, the water 18 is spouted into the chamber 14a in the casing 14 by the aid of the respective water-spouting nozzles 202a to 202d. The powder flow dust 20a which floats in the chamber 14a and the powder flow dust 20a which adheres to the arm section 102 of the rotor 100 are forcibly discharged toward the bottom 14d of the casing 14. The water 18 is spouted from the water-spouting nozzle 206 installed to the water pipe 204. The water 18 is used to wash the lower side of the arm section 102. The water 18 spouted from the respective nozzles 208a to 208f is used to perform the washing operation for the gear 12.

The drainage containing the powder flow dust 20a, which is generated during the washing operation effected by the liquid-spouting means 200, flows along the inclination of the bottom 14d. As shown in FIGS. 3 and 14, the drainage is fed via the joint tube 224 coupled to the casing 14 through the tubes 226, 228 to the centrifugal separator 300 which constitutes the classifying mechanism 28.

On the other hand, when the compressed air is introduced from the compressed air supply port 214 by operating the negative pressure-generating section 212, then the negative pressure is generated at the suction port 210, and the powder flow dust 20a, which floats in the chamber 14a of the casing 14, is sucked from the suction port 210 to the chamber 216 to be decelerated. The showering is effected in the chamber 216 by the aid of the liquid-spouting means 220 arranged in the casing 218. The drainage containing the powder flow dust 20a is introduced from the tube 222 via the joint tube 224 and the tubes 226, 228 into the centrifugal separator 300. On the other hand, the compressed air is discharged to the outside from the air tube 230. The external air is introduced from the air-introducing tube 232 into the chamber 14a.

Figure 19:
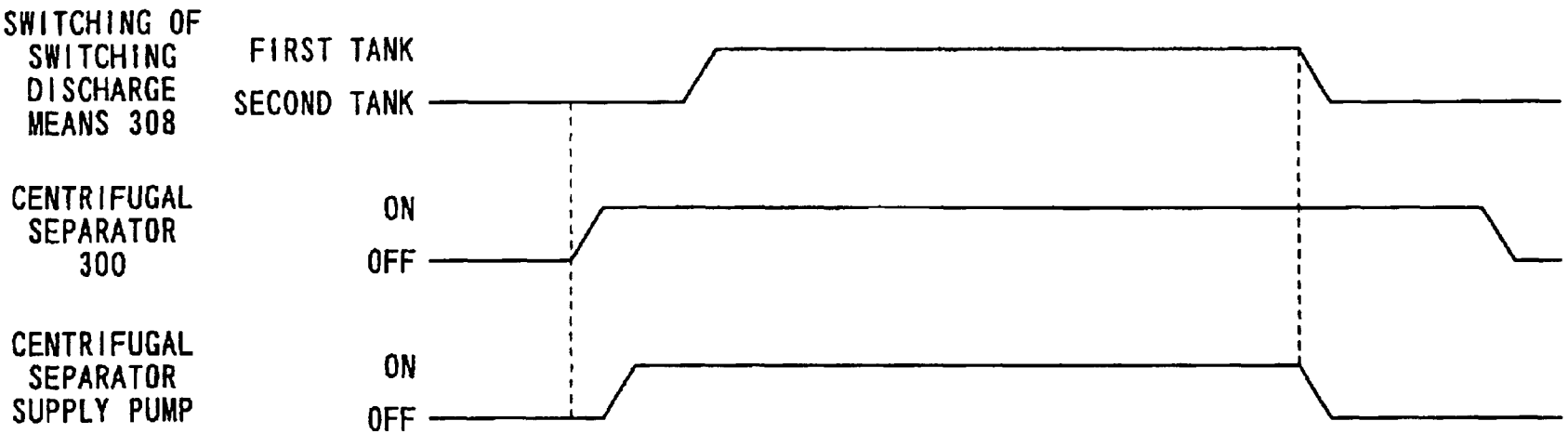
FIG 19 shows a time chart illustrating the operation of the classifying mechanism.

In the centrifugal separator 300, the switching discharge means 308 is operated in accordance with a time chart shown in FIG. 19. That is, the centrifugal separator 300 does not arrive at a predetermined number of revolution immediately after the start of the operation. Therefore, a period exists, in which the powder flow dust 20a and the water 18 cannot be completely separated from the drainage. Accordingly, the first receiving member 320, which constitutes the switching discharge means 308, is previously arranged corresponding to the liquid discharge port 304 of the centrifugal separator 300 (see solid lines shown in FIG. 17).

Therefore, the powder flow dust 20a as the solid content is discharged to the sludge recovery box 306 from the sludge discharge port 302 of the centrifugal separator 300. On the other hand, the water 18 containing the powder flow dust 20a is discharged from the liquid discharge port 304 to the first drainage tube 326 which is connected to the first receiving member 320. The water 18 is introduced from the first drainage tube 326 to the second tank 312.

Subsequently, the centrifugal separator supply pump (not shown) is operated. After passage of a predetermined period of time from the start of the operation of the centrifugal separator 300, the cylinder 316, which constitutes the switching discharge means 308, is operated. Accordingly, as shown in FIGS. 15 and 16, the first and second receiving members 320, 322 are integrally moved in the direction of the arrow A by the aid of the rod 318. The second receiving member 322 is arranged corresponding to the liquid discharge port 304 of the centrifugal separator 300 (see two-dot chain lines shown in FIG. 17). Therefore, the water 18, which is discharged from the centrifugal separator 300, is once discharged to the receiving tank 300 via the second drainage tube 328 connected to the second receiving member 322. After that, the water 18 is stored in the first tank 310 which accommodates the receiving tank 330.

In the first tank 310, the level sensor 334 is used to detect the water level of the water 18 stored in the first tank 310. The first pump 336 and the second pump 338 are selectively operated, if necessary. As shown in FIG. 18, when the first pump 336 for constructing the supply mechanism 342 is operated, the water 18 in the first tank 310 is fed via the water passage 340 to the liquid-spouting means 200 which constitutes the recovery mechanism 26. Accordingly, the water 18 is spouted into the chamber 14a, and it is used for the washing operation for the gear 12 and the arm section 102 and for the recovery operation for the powder flow dust 20a floating in the chamber 14a. When the second pump 338 is operated, the water 18 in the first tank 310 is discharged to the outside.

Subsequently, when the operation of the centrifugal separator 300 is stopped, the switching discharge means 308 is operated on the basis of the stop signal of the unillustrated centrifugal separator supply pump. The first receiving member 320 is arranged corresponding to the liquid discharge port 304. After that, the stop operation for the centrifugal separator 300 is performed. During the stop operation for the centrifugal separator 300, it is impossible to reliably remove the powder flow dust 20a from the drainage due to the decrease in number of revolution. The water 18 containing the powder flow dust 20a is discharged toward the second tank 312. Accordingly, only the water 18, from which the powder flow dust 20a is completely removed, is always stored in the first tank 310.

After the door structure 120 is opened upon the completion of the strength-enhancing treatment for the gear in the chamber 14a, the cylinder 38, which constitutes the metal part-holding mechanism 16, is operated. As shown in FIG. 6, the slide rod 73 is coupled to the rod 71 of the cylinder 38. When the slide rod 73 is moved in the direction indicated by the arrow A2, then the driven rotary section 34 is moved in the direction indicated by the arrow A2 integrally with the holding member 74, and it is disengaged from the end of the gear 12 (see FIG. 7).

Accordingly, the gear 12 is removed from the space between the driving rotary section 30 and the driven rotary section 34. A new gear 12 is arranged between the driving rotary section 30 and the driven rotary section 34. Further, the cylinder 38 is operated, and the both ends of the new gear 12 are pressed and interposed by the driving rotary section 30 and the driven rotary section 34.

In the first embodiment, when the strength-enhancing treatment is applied to the gear 12 by the aid of the projecting mechanism 24 in the chamber 14a, the liquid-spouting means 200, which constitutes the recovery mechanism 26, is operated. Accordingly, the showering is effected for the whole interior of the chamber 14a in the casing 14 by the aid of the respective water-spouting nozzles 202a to 202d. The water 18 is effectively spouted toward the powder flow dust 20a floating in the chamber 14a and the powder flow dust 20a adhering to the arm section 102 of the robot 100. 20 Accordingly, the powder flow dust 20a floating in the chamber 14a and the powder flow dust 20a adhering to the arm section 102 are mixed with the drainage, and they are discharged forcibly and reliably toward the bottom 14d of the casing 14. Therefore, when the double door 120 is opened, it is possible to reliably avoid the leakage of the powder flow dust 20a from the opening 14b to the outside.

Further, in the first embodiment, when the strength-enhancing treatment is applied to the gear 12 by the aid of the projecting mechanism 24 in the chamber 14a, the powder flow dust 20a, which is generated when the glass beads 20 are crushed, is recovered together with the drainage by the aid of the recovery mechanism 26. After that, the classifying mechanism 28 is used to classify the drainage into the water 18 and the powder flow dust 20a.

Accordingly, when the classified powder flow dust 20a is introduced into the sludge recovery box 306, the powder to flow dust 20a can be easily used, for example, for the operation for producing the glass beads 20. On the other hand, the water 18, which is separated from the drainage, is stored in the first tank 310, and then it is supplied to the recovery mechanism 26 in accordance with the action of the supply mechanism 342 provided with the first pump 336. Thus, the water 18 is recycled, for example, as washing water. Thus, an effect is obtained in that the resource can be effectively utilized with ease by using the simple system.

In the first embodiment, the classifying mechanism 28 includes the first tank 310 for storing the water 18 from which the powder flow dust 20a is removed, and the second tank 312 for storing the water 18 containing the powder flow dust 20a in the mixed manner. The switching discharge means 308 is provided in order that the impure liquid (water 18 mixed with the powder flow dust 20a), which tends to be generated upon the start and the stop of the centrifugal separator 300, is discharged to the second tank 312.

Therefore, only the water 18, from which the powder flow dust 20a is completely removed, is always stored in the first tank 310. The water 18 in the first tank 310 can be maintained to be clean. Accordingly, it is advantageous that when the water 18 in the first tank 310 is supplied, for example, to the recovery mechanism 26, it is possible to effectively perform various operations, for example, the operation for recovering the mist, based on the use of the it water 18 free from impurities.

Figure 20:
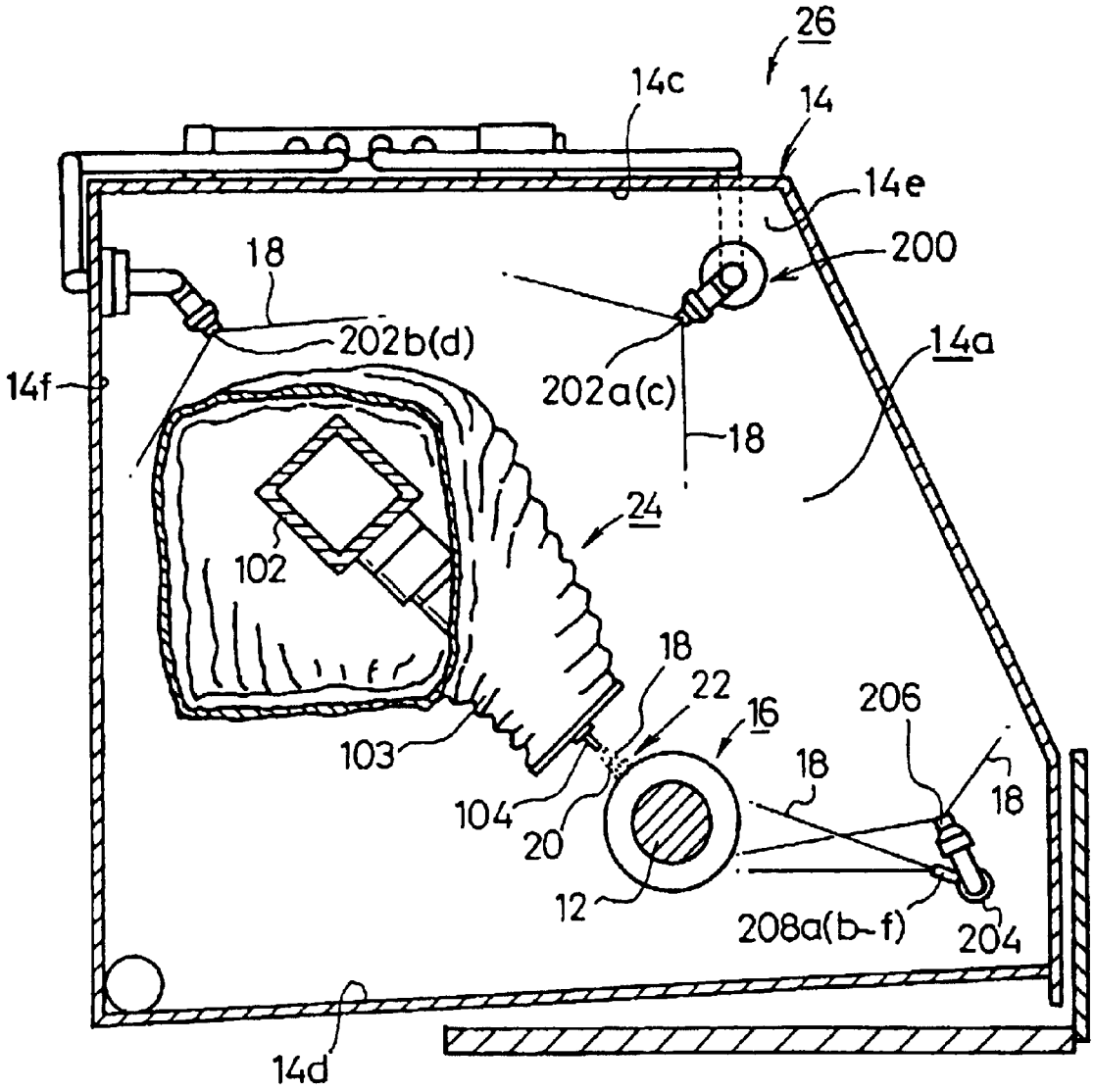
FIG. 20 shows another partial front view illustrating a state in which a liquid-spouting means for constructing the recovery mechanism is installed to a wall.

In the first embodiment, the respective water-spouting nozzles 202a to 202d, which constitute the liquid-spouting means 200, are installed to the ceiling 14c of the casing 14. However, as shown in FIG. 20, it is also preferable that the respective water-spouting nozzles 202a to 202d are arranged on the walls 14e, 14f of the casing 14 in place of the foregoing arrangement or in addition to the foregoing arrangement.

Further, in the first embodiment, the door structure 120 is provided with the inner slide door 122 and the outer slide door 124. The pressing means 132 is used to allow the inner side surface 128 of the inner slide door 122 to make tight contact with the outer wall 130 of the casing 14 for forming the chamber 14a. Accordingly, the mist, which contains the powder flow dust 20a generated when the spouting stream 22 is projected onto the gear 12 by the aid of the projecting mechanism 24 in the chamber 14a of the casing 14, does not leak to the outside from the opening 14b. Therefore, it is possible to reliably avoid any occurrence of problems concerning, for example, the maintenance of the strength-enhancing apparatus 10 and the surrounding environment.

In the chamber 14a, the noise is considerably large when the glass beads 20 are projected onto the surface of the gear 12. However, in the first embodiment, the opening 14b is closed by the double door, i.e., the inner slide door 122 and the outer slide door 124. Therefore, an effect is obtained in that it is possible to effectively ensure the noise control performance.

The following operation is performed when the gear 12 applied with the strength-containing treatment in the chamber 14a is taken out, and a new gear 12 is arranged in the chamber 14a. At first, when the cylinder 152 of the driving means 126 is operated, and the rod 154 is displaced in the direction of the arrow A, then the attachment plate 138, which is coupled to the rod 154 by the aid of the coupling member 156, is moved in the direction of the arrow A integrally with the inner slide door 122 in accordance with the rolling action of the support rollers 140a, 140b, the upper rollers 142a, 142b, and the lower rollers 144a, 144b.

Figure 21:
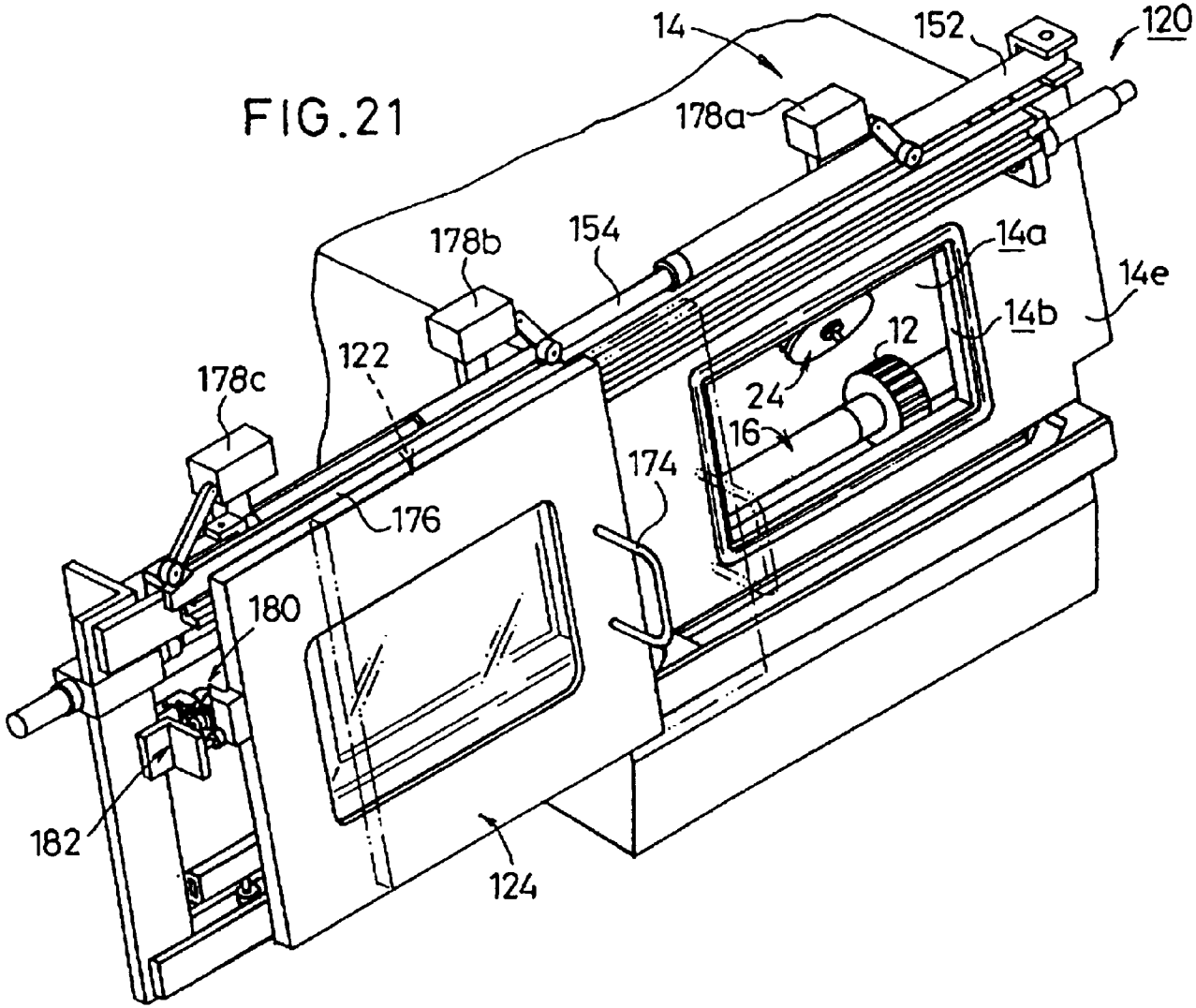
FIG. 21 shows a perspective view illustrating a state in which the door structure is open.

In this arrangement, the outer slide door 124 is held on the attachment plate 138 by the aid of the projection member 190 and the pawl member 186 of the engaging means 180. The inner slide door 122 and the outer slide door 124 are moved integrally in the direction of the arrow A by the aid of the driving means 126. Accordingly, the opening 14b of the casing 14 is opened to the outside, while the inner slide door 122 and the outer slide door 124 are arranged at the open position (see FIG. 21).

Figure 22:
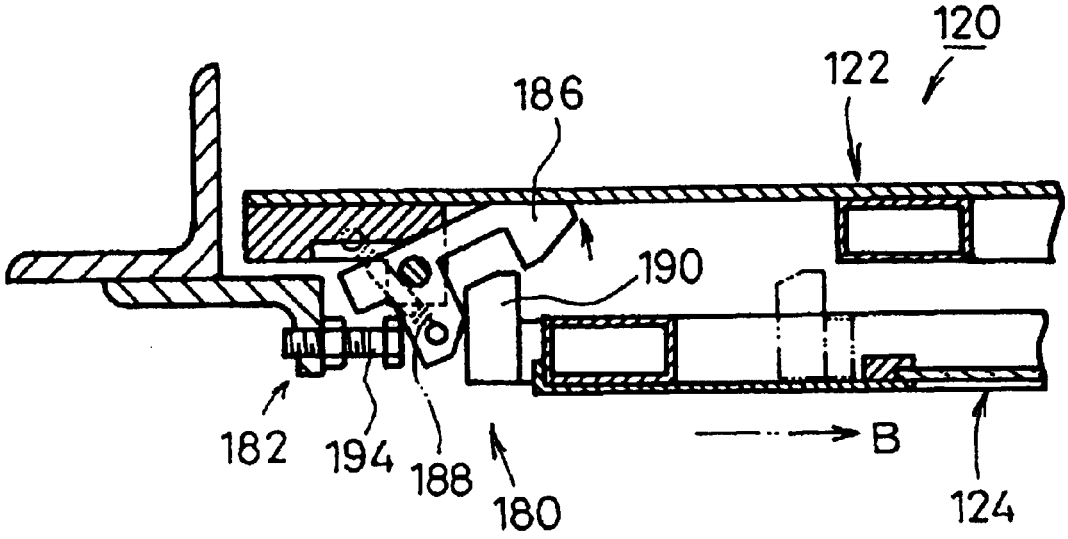
FIG. 22 illustrates the operation of the engaging means and a release means.

It is noted that the pressing bolt 194 of the release means 182 is provided at the open position. The expansion 192 of the pawl member 186 for constructing the engaging means 180 is pressed by the pressing bolt 194. Therefore, as shown in FIG. 22, the pawl member 186 makes swinging movement in the direction to make separation from the projection member 190 against the elastic force of the spring 188. Thus, the engagement state of the pawl member 186 and the projection member 190 is released. The gear 12 in the chamber 14a is removed from the metal part-holding mechanism 16 through the opening 14b. After that, a new gear 12 is set to the metal part-holding mechanism 16.

Subsequently, when the inner slide door 122 and the outer slide door 124 are closed, then an operator grips the hand section 174 of the outer slide door 124, and the outer slide door 124 is moved toward the opening 14b (in the direction indicated by the arrow B). Accordingly, the dog plate 176, which is fixed to the outer slide door 124, effects the ON/OFF operation for the switches 178a to 178c. The driving means 126 is operated on the basis of the resulting signal, and the inner slide door 122 is automatically moved from the open position toward the closed position.

When the inner slide door 122 approaches the side of the opening 14b, then the upper rollers 142a, 142b and the lower rollers 144a, 144b, which constitute the pressing means 132, contact with the upper plates 158a, 158b and the lower plates 160a, 160b, and the inner slide door 122 is retracted toward the casing 14. Accordingly, the inner side surface 128 of the inner slide door 122 makes tight contact with the outer wall 130 of the casing 14.

As described above, in the first embodiment, the opening/closing operation is simplified all at once for the inner slide door 122 and the outer slide door 124 which constitute the double door. Thus, an effect is obtained in that the operability of the door structure 120 is greatly improved because of the following reason. That is, it is sufficient for the operator to manually operate only the outer slide door 124.

In the first embodiment, the first end of the gear 12 is supported by the driving rotary section 30 which constitutes the spindle unit 32. The second end of the gear 12 is supported by the driven rotary section 34 which constitutes the support means 36. The servo motor 40 of the spindle unit 32 is driven in the state in which the gear 12 is pressed and interposed by the driven rotary section 34 and the driving rotary section 30 by the aid of the cylinder 38.

Accordingly, the gear 12 is rotated and driven while being tightly pressed and held at its both ends by the driving rotary section 30 and the driven rotary section 34, Therefore, especially when a lengthy gear 12 such as a counter shaft is used, it is possible to reliably prevent the gear 12 from deflection during the rotation. Accordingly, it is possible to rotate the gear 12 highly accurately. An effect is obtained in that the appropriate compressive residual stress can be reliably given to the entire tooth surface of the gear 12 by the aid of the projecting mechanism 24.

Further, the both ends of the gear 12 are interposed by using the first and second support members 50, 80 of the driving rotary section 30 and the driven rotary section 34. Therefore, it is advantageous that the production cost is greatly reduced, for example, as compared with those based on the use of a collet chuck.

Figure 23:
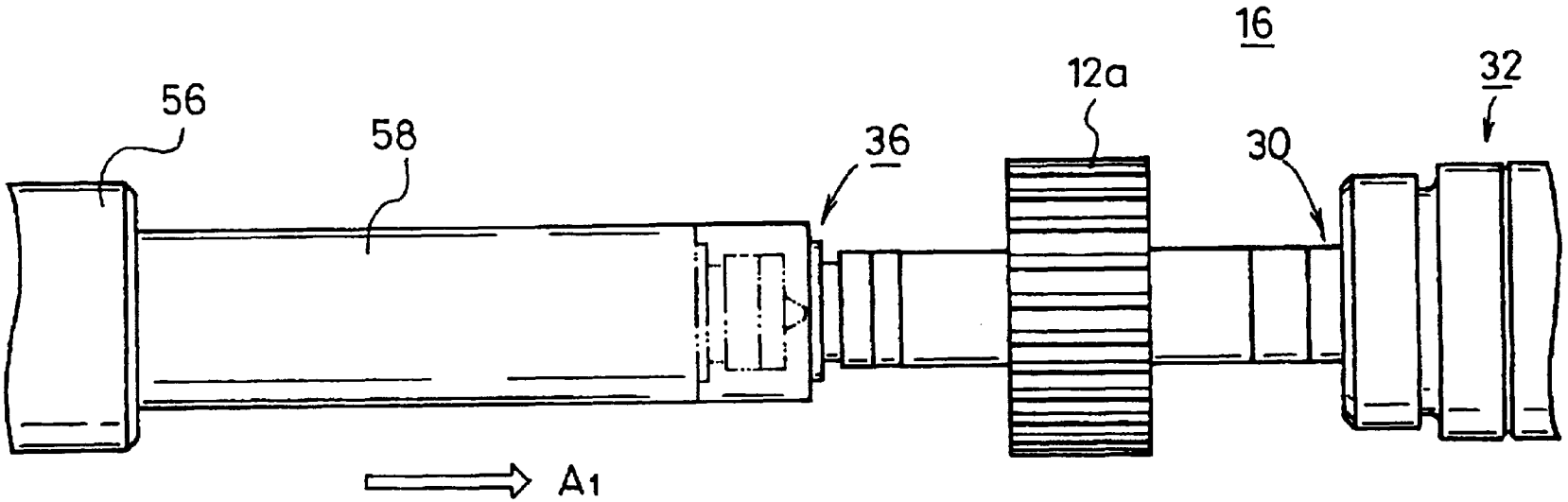
FIG. 23 illustrates an arrangement in which a short gear is held by the metal part-holding mechanism.

When the strength-enhancing treatment is applied to a short gear 12a as shown in FIG. 23 in place of the lengthy gear 12 such as a counter shaft, the position-adjusting means 54 of the metal part-holding mechanism 16 is operated. That is, as shown in FIG. 6, when an operator grips the handle 62 to rotate it, then the screw shaft 64 coupled to the handle 62 is rotated, and the sleeve member 58 is moved in the direction indicated by the arrow A1 integrally with the nut member 70 externally fitted to the screw shaft 64.

The support means 36 and the cylinder 38 are installed to the sleeve member 58. As the sleeve member 58 is moved in the direction of the arrow A1, the positions of the support means 36 and the cylinder 38 are adjusted in the direction of the arrow A1. After the support means 36 is positioned corresponding to the shaft length of the short gear 12a, the strength-enhancing treatment is applied to the gear 12a in the same manner as described above.

In this way, in the first embodiment, the position of the support means 36 is previously set by the aid of the position-adjusting means 54 corresponding to the various gears 12, 12a having different lengths. Accordingly, the stroke amount of the driven rotary section 34 brought about by the cylinder 308 does not differ depending on the lengthy gear 12 and the short gear 12a. An effect is obtained in that the minimum stroke amount is used to efficiently perform the attachment/detachment operation for the gear 12, 12a in a short period of time. Further, the position-adjusting means 54 is based on the simple arrangement provided with the handle 62 which is rotated by the manual operation. It is possible to easily simplify the entire structure of the metal part-holding mechanism 16.

Figure 24:
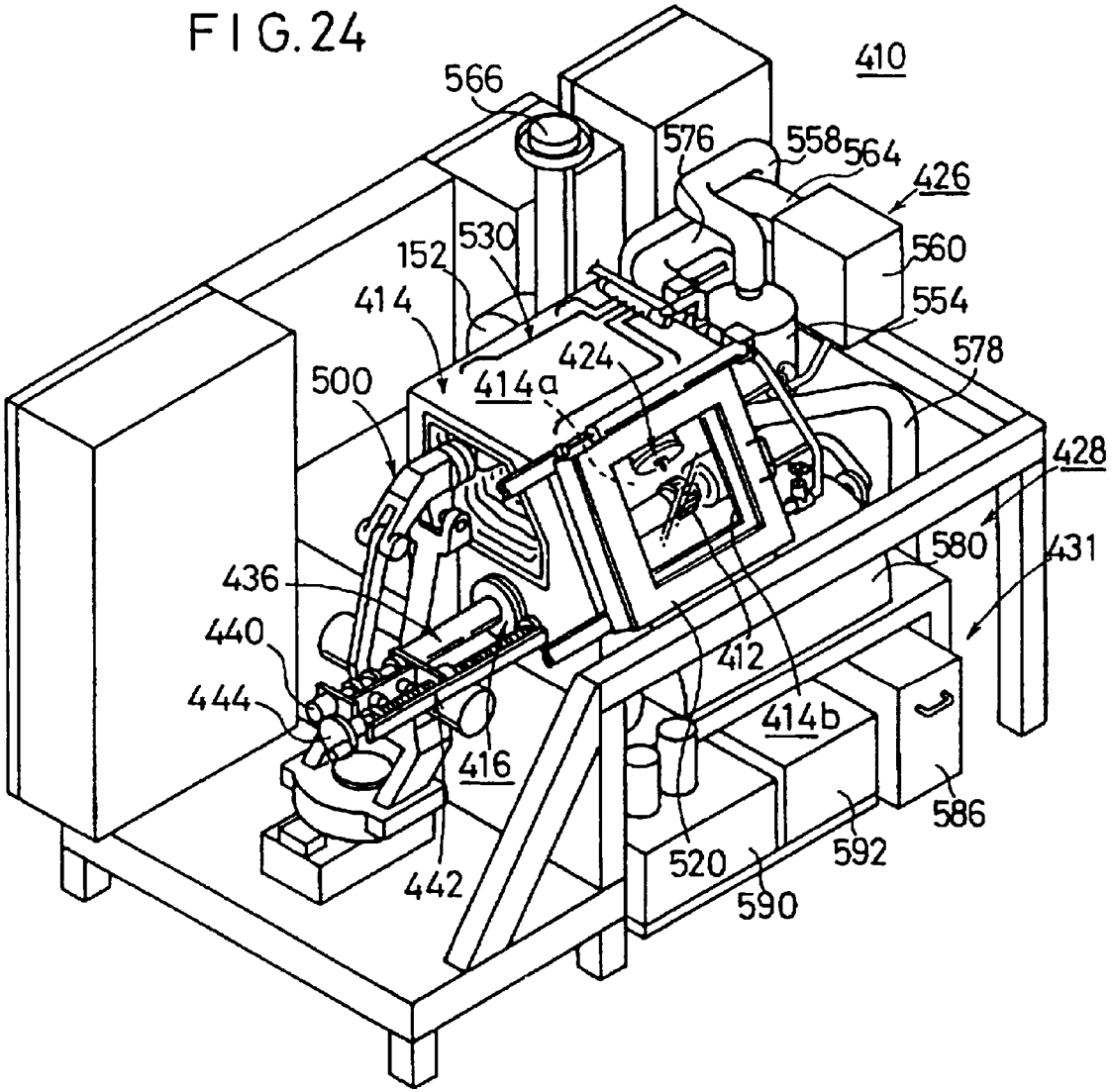
FIG. 24 shows a schematic perspective view illustrating a strength-enhancing apparatus according to a second embodiment of the present invention.
Figure 25:
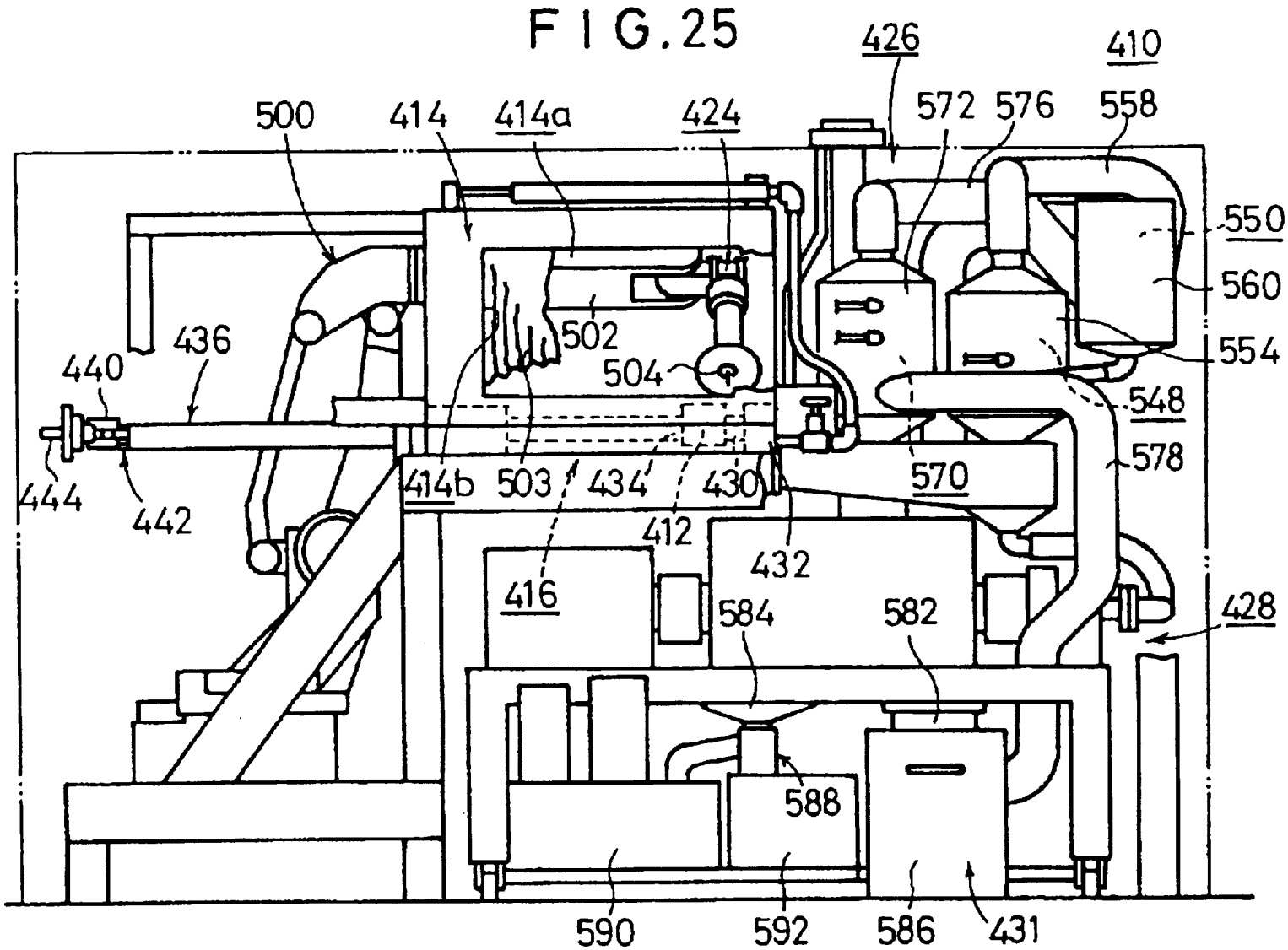
FIG. 25 shows a front view illustrating the strength-enhancing apparatus.
Figure 26:
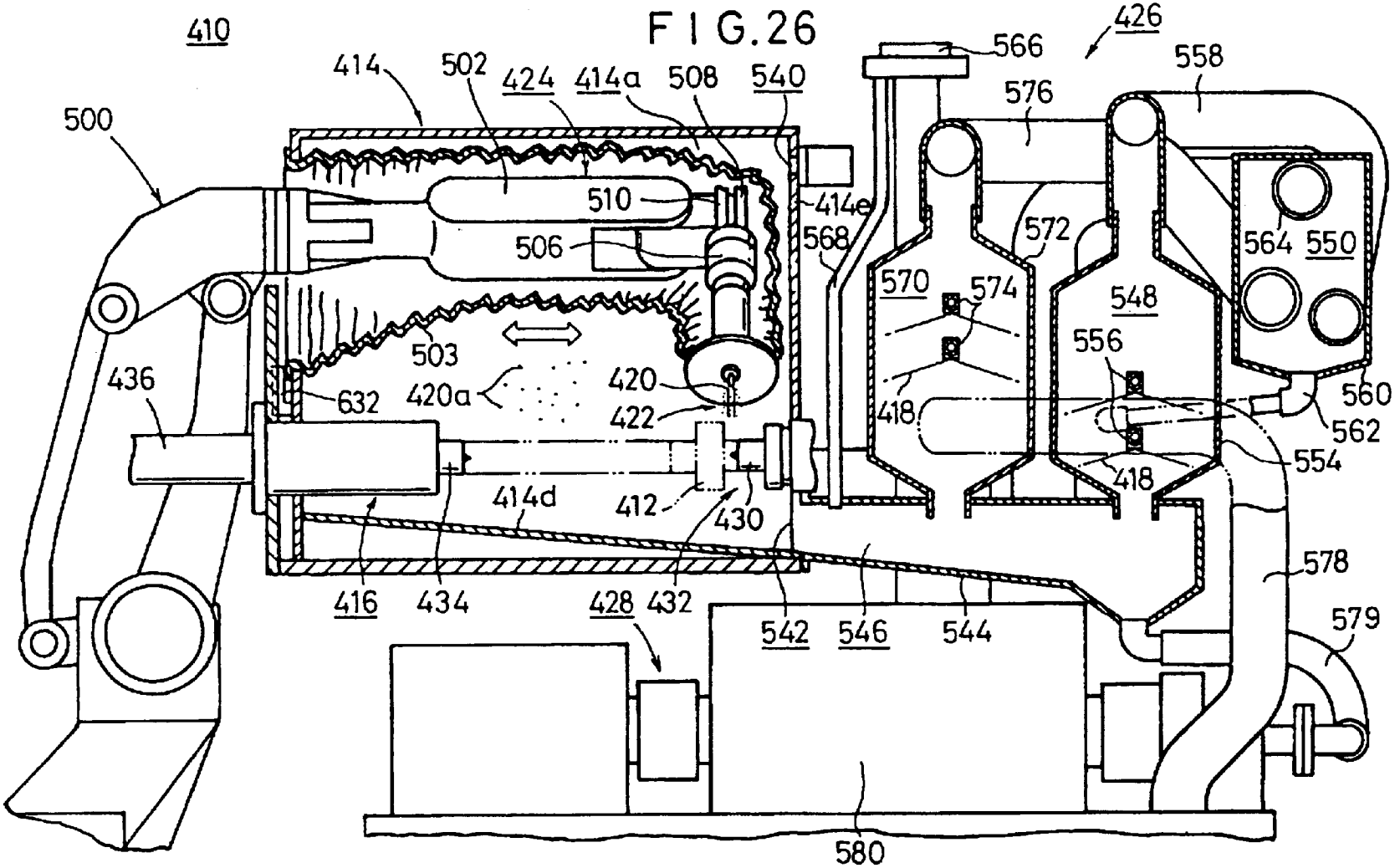
FIG. 26 shows a magnified partial sectional front view illustrating an upper portion of the strength-enhancing apparatus.

FIG. 24 shows a schematic perspective view illustrating a strength-enhancing apparatus 410 according to a second embodiment of the present invention. FIG. 25 shows a front view illustrating the strength-enhancing apparatus 410. FIG. 26 shows a magnified partial sectional front view illustrating an upper portion of the strength-enhancing apparatus 410.

The strength-enhancing apparatus 410 comprises a metal part-holding mechanism 416 for holding a metal part 412 (shown in the drawing as having a gear shape) to be processed, for example, a gear, a connecting rod, or a crank shaft so that the metal part 412 is positioned and held in a processing chamber 414a in a casing 414, a projecting mechanism 424 for projecting a spouting stream 422 of liquid such as water 418 and glass beads 420 toward the metal part 412, a recovery mechanism 426 for recovering powder flow dust 420a generated from the glass beads 420 crushed on the surface of the metal part 412, together with drainage, a classifying mechanism 428 for classifying the recovered drainage into the water 418 and the powder flow dust 420a, and a powder flow dust-accommodating unit 431 for storing the classified powder flow dust 420a.

The metal part-holding mechanism 416 includes a spindle unit 432 which is provided with a driving section 430 for making contact with a first end of the metal part 412, and a support means 436 which is provided with a rotary section 434 for supporting a second end of the metal part 412. The spindle unit 432 is provided with a servo motor (not shown) for rotating and driving the driving unit 430. On the other hand, the support means 436 includes a cylinder 440 for moving the rotary section 434 back and forth in the axial direction. The support means 436 is adjustable for its position in the axial direction by the aid of a position-adjusting means 442. As shown in FIG. 24, the position-adjusting means 442 includes a manual handle 444. The position of the support means 436 is changed by rotating and operating the manual handle 444.

The projecting mechanism 424 includes a robot 500 which is arranged at the outside of the casing 414. An arm section 502 for constructing the robot 500 is arranged in the processing chamber 414a in the casing 414 in a state of being protected by a bellows member 503. A nozzle 504 is installed to the forward end of the arm section 502. A mixing chamber 506 for mixing the water 418 and the glass beads 420 is coupled to an upper portion of the nozzle 504. The water 418 and the glass beads 420 are supplied from the unillustrated water supply source and a hopper coupled via tube passages 508, 510 respectively (see FIG. 26).

Figure 27:
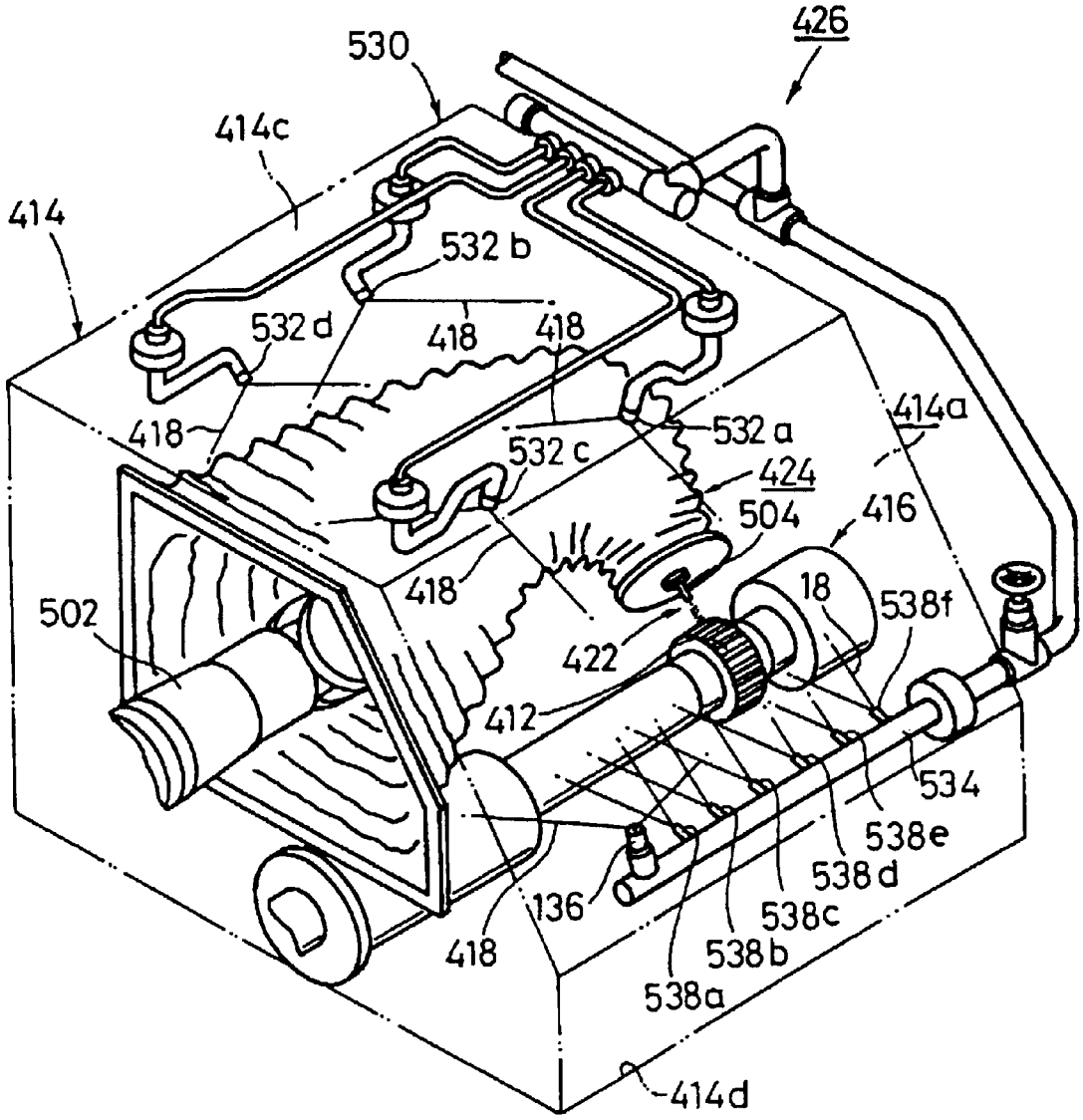
FIG. 27 shows a partial perspective view illustrating a recovery mechanism for constructing the strength-enhancing apparatus.

The casing 414 is provided with an opening 414b for opening the processing chamber 414a to the outside. The opening 414b is opened and closed by the aid of a door structure 520 as a double door (see FIG. 24). A liquid-spouting means 530 for constructing the recovery mechanism 426 is arranged in the processing chamber 414a. As shown in FIG. 27, the liquid-spouting means 530 is arranged on the side of the ceiling 414c of the casing 414. The liquid-spouting means 530 is provided with four water-spouting nozzles 532a to 532d for spouting a liquid, for example, the water 418 over wide angles in the processing chamber 414a. Each of the water-spouting nozzles 532a to 532d is designed for the spouting angle and the direction so that the water 418 may be spouted over the whole interior of the processing chamber 414a.

The bottom 414d of the casing 414 is formed to be inclined toward a certain corner (see FIG. 26). A water 5 pipe 534 is arranged in the close vicinity of the bottom 414d. As shown in FIG. 27, the water pipe 534 is provided with a water-spouting nozzle 536 for spouting the water 418 over a wide angle to wash the lower surface side of the arm section 502 of the robot 500, the nozzles 538a to 538f for washing the metal part.

As shown in FIG. 26, an external air inflow port 540, through which the external air can be introduced into the processing chamber 414a, is provided at an upper portion of the side 414e of the casing 414. On the other hand, a suction port 542, which is open to the processing chamber 414a, is formed at a lower portion of the side 414e. A tube member 544 is coupled to the lower portion of the side 414e of the casing 414. A discharge passage 546 in the tube member 544 communicates with the suction port 542. A first chamber 548, which communicates via the discharge passage 546 with the suction port 542, is arranged on the tube member 544. A blower (suction means) 552 is coupled to the first chamber 548 via a second chamber 550.

Figure 28:
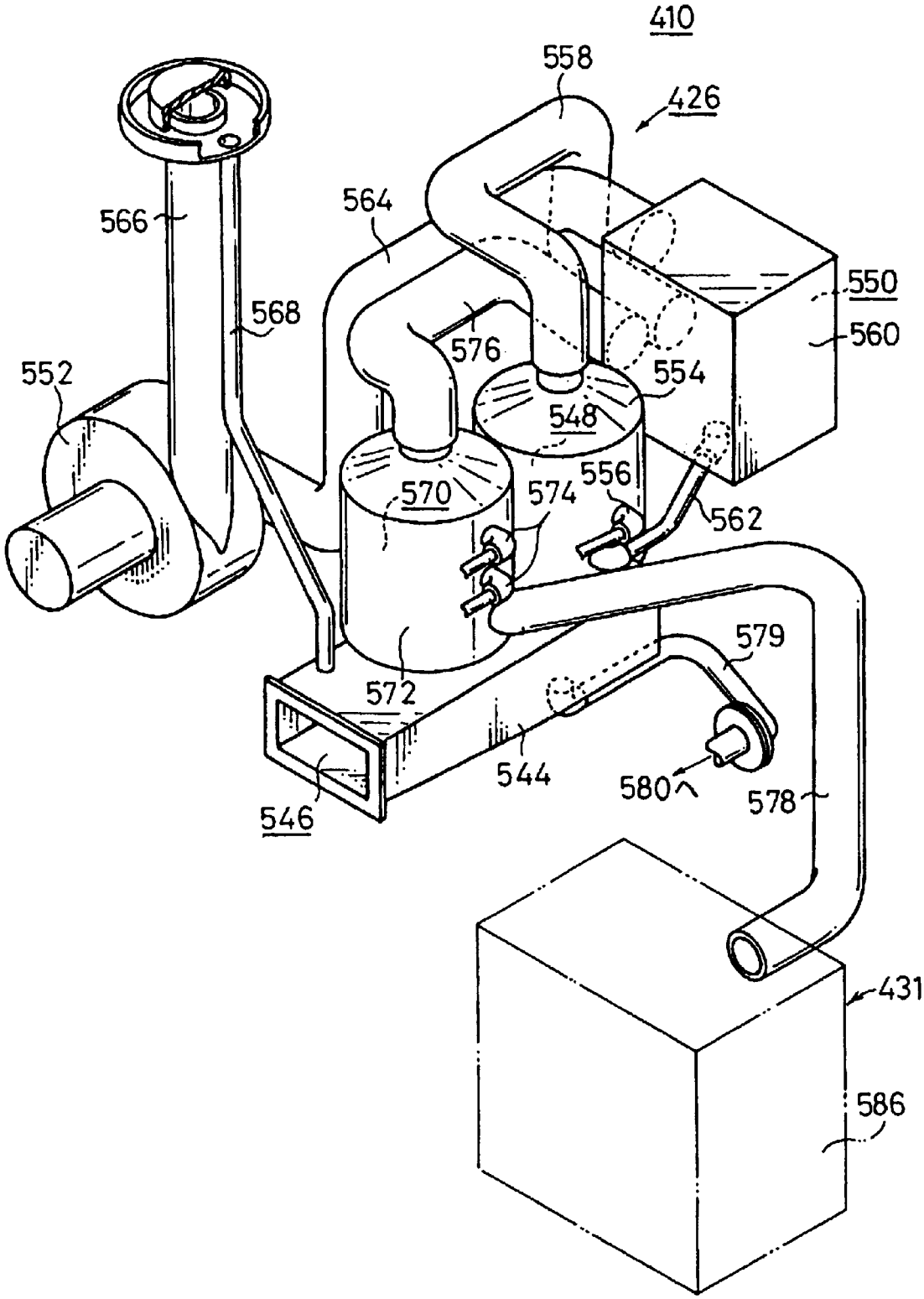
FIG. 28 shows another partial perspective view illustrating the recovery mechanism.

As shown in FIGS. 26 and 28, the lower end of a first casing 554 for constructing the first chamber 548 is coupled to the tube member 544. A liquid-spouting means 556 is installed in the first casing 554. The water 418 is spouted from the liquid-spouting means 556. Thus, the showering is effected in the first chamber 548. A first end of a first tube 558 is connected to an upper portion of the first casing 554. A second end of the first tube 558 is fixed at a lower end side portion of a second casing 560 for constructing the second chamber 550.

A piping tube 562, which is provided at the lower end of the second casing 560, is coupled to the side of the first casing 554 in the close vicinity of the liquid-spouting means 556. On the other hand, a second tube 564, which is connected to an upper end side portion of the second casing 560, is coupled to the blower 552. A piping tube 568 is coupled to the tube member 544 and an upper portion of a discharge tube 566 provided for the blower 552.

A third casing 572, which is disposed between the processing chamber 414a and the first chamber 548 for constructing a third chamber 570, is coupled to the tube member 544. The third casing 572 has its lower end opening diameter which is formed to be smaller than the lower end opening diameter of the first casing 554 (see FIG. 26). The third casing 572 is installed with a liquid-spouting means 574 which is disposed therein at a relatively upper position. The showering is effected in the third chamber 570 by using the water 418 spouted from the liquid-spouting means 574. Both ends of a third tube 576 are connected to an upper portion of the third casing 572 and a lower end side portion of the second casing 560. A first end of a fourth tube (communication passage) 578 is coupled to the lower side of the third casing 572. A second end of the fourth tube 578 is coupled to the powder flow dust-accommodating unit 431.

A centrifugal separator 580 for constructing the classifying mechanism 428 is connected via a tube 579 to a lower end portion on the downstream side of the tube member 544. The classifying mechanism 428 is arranged under the casing 414. As shown in FIG. 25, the centrifugal separator 580 for constructing the classifying mechanism 428 is provided with a sludge discharge port 582 for discharging the powder flow dust 420a as the separated solid content, and a liquid discharge port 584 for discharging the water 418 as the separated liquid. A sludge recovery box 586 for constructing the powder flow dust-accommodating unit 431 is arranged under the sludge discharge port 582. On the other hand, a first tank (clean tank) 590 and a second tank (dirty tank) 592 are selectively coupled via a switching discharging means 588 to the liquid discharge port 584.

The fourth tube 578 is connected to an upper portion of the sludge recovery box 586. The sludge recovery box 586 communicates with the third chamber 570. The first tank 590 is a tank for storing the water 418 from which the powder flow dust 420a is completely removed, and it is designed to have a relatively large capacity. The second tank 592 is a tank for storing the water 418 containing the powder flow dust 420a in a mixed manner, and it is designed to have a capacity smaller than that of the first tank 590.

Figure 29:
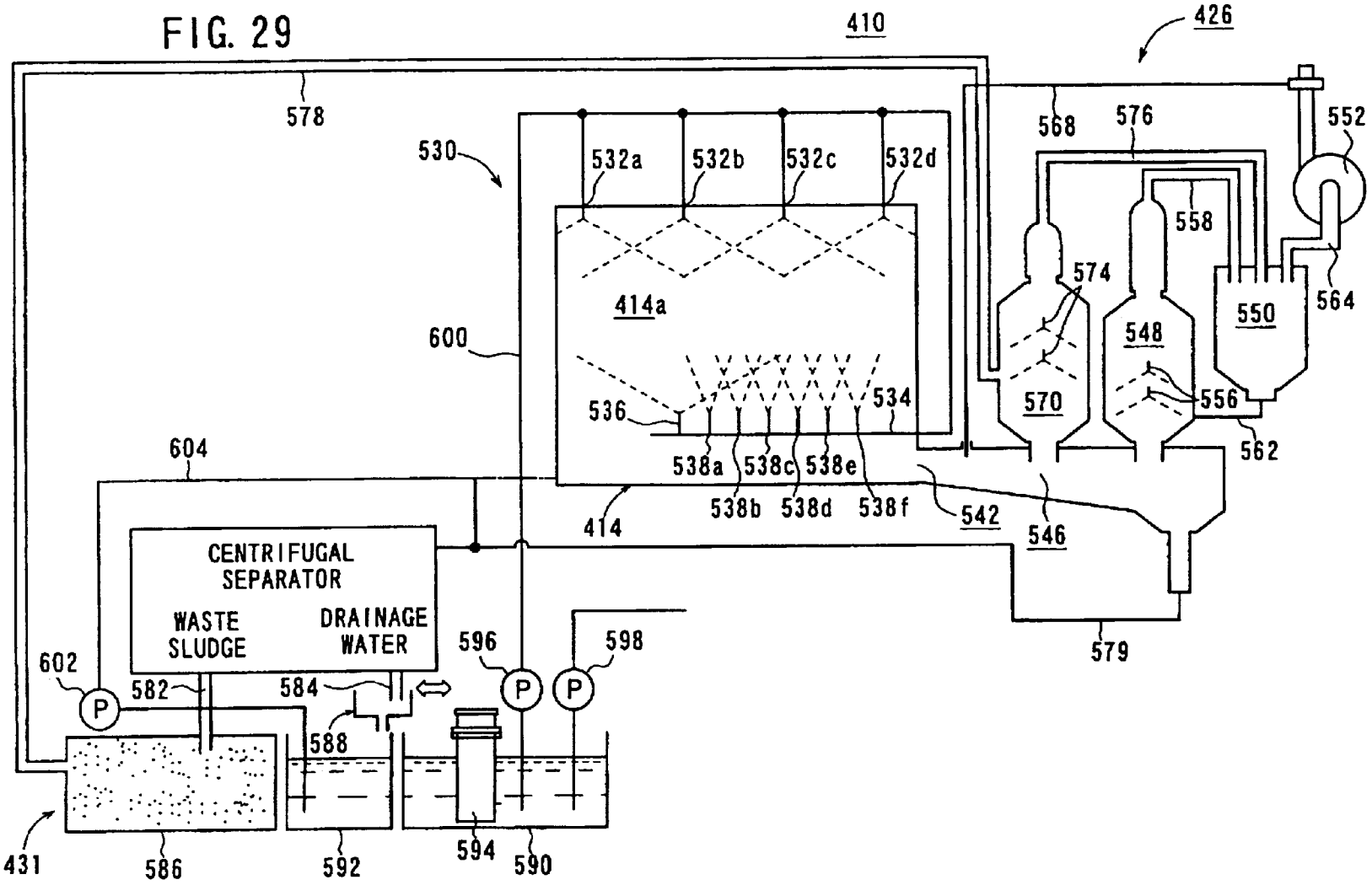
FIG. 29 illustrates a circuit of the strength-enhancing apparatus.

As shown in FIG. 29, a level sensor 594 is provided in the first tank 590. The water level in the first tank 590 is detected at four positions, i.e., the upper limit position, the discharge start position, the discharge stop position, and the lower limit position. A first pump 596 and a second pump 598 are arranged for the first tank 590. The first pump 596 supplies the water 418 in the first tank 590 via a water passage 600 to the liquid-spouting means 530 in the casing 414. The second pump 598 functions to discharge the water 418 in the first tank 590 to the outside. A third pump 602 is arranged for the second tank 592. The third pump 602 communicates with the drainage inlet side of the centrifugal separator 580 via a pumping tube 604.

Explanation will be made below for the operation of the strength-enhancing apparatus 410 constructed as described above.

At first, the first end of the metal part 412 is held by the driving section 430 of the spindle unit 432 which constitutes the metal part-holding mechanism 416. In this state, the rotary section 434 of the support means 436 is displaced toward the metal part 412 in accordance with the action of the cylinder 440 to support the second end of the metal part 412. The door structure 520 is closed, and the opening 414b of the casing 414 is closed. In this state, the servo motor (not shown), which constitutes the spindle unit 432, is driven to rotate the metal part 412 (see FIG. 26).

During this process, the water 418 and the glass beads 420 are fed under the pressure via the respective tube passages 508, 510 to the mixing chamber 506 in accordance with the action of an unillustrated high pressure pump which constitutes the projecting mechanism 424. Accordingly, the spouting stream 422 of the water 418 and the glass beads 420 is projected while maintaining the directivity from the nozzle 504 toward the metal part 412.

Further, the nozzle 504 is moved in the predetermined direction, i.e., in the axial direction of the metal part 412 by the aid of the arm section 502 which constitutes the robot 500. The compressive residual stress is given by the glass beads 420 to the entire outer circumferential surface of the metal part 412. Simultaneously, the glass beads 420 are crushed. The powder flow dust 420a, which is generated when the glass beads 420 are crushed, floats in the casing 414. The liquid-spouting means 530 and the blower 552, which constitute the recovery mechanism 426, are operated.

The liquid-spouting means 530 is operated as follows. That is, as shown in FIG. 27, the water 418 is spouted into the processing chamber 414a in the casing 414 by the aid of the respective water-spouting nozzles 532a to 532d. The powder flow dust 420a which floats in the processing chamber 414a and the powder flow dust 420a which adheres to the arm section 502 of the robot 500 are forcibly discharged toward the bottom 414d of the casing 414. The water 418 is spouted from the water-spouting nozzle 536 installed to the water pipe 534. The water 418 is used to wash the lower side of the arm section 502. The water 418 spouted from the respective nozzles 538a to 538f is used to perform the washing operation for the metal part 412.

The drainage containing the powder flow dust 420a, which is generated during the washing process effected by the liquid-spouting means 530, flows along the inclination of the bottom 414d. As shown in FIGS. 26 and 28, the drainage is fed via the tube 579 from the discharge passage 546 of the tube member 544 coupled to the casing 414 to the centrifugal separator 580 which constitutes the classifying mechanism 428.

On the other hand, when the blower 552 is operated, the suction is exerted on the atmosphere in the second chamber 550 which communicates with the blower 552 via the second tube 564. Further, the suction is exerted on the atmospheres in the first and third chambers 548, 570 which communicate with the second chamber 550 via the first and third tubes 558, 576. Accordingly, the negative pressure is generated at the suction port 542 via the discharge passage 546. The mist, which contains the powder flow dust 420a floating in the processing chamber 414a in the casing 414, is sucked from the suction port 542 via the discharge passage 546 to the first and third chambers 548, 570, and it is decelerated.

In this embodiment, the lower end opening diameter of the first casing 554 is designed to be larger than the lower end opening diameter of the third casing 572. The powder flow dust 420a floating in the processing chamber 414a is dominantly sucked to the first chamber 548. In the first chamber 548, the showering is effected by the aid of the liquid-spouting means 556 arranged in the first casing 554. The drainage containing the powder flow dust 420a is fed to the centrifugal separator 580 via the discharge passage 546 and the tube 579. Similarly, in the third chamber 570, the showering is effected by using the water 418 spouted from the liquid-spouting means 574. The drainage containing the powder flow dust 420a is introduced into the centrifugal separator 580.

The air in the first and third chambers 548, 570 is sucked via the first and third tubes 558, 576 to the second chamber 550, and it is decelerated. The air is further sucked from the second tube 564 to the blower 552, and it is discharged to the outside from the discharge tube 566. During this process, the water content generated in the second chamber 550 and the remaining powder flow dust 420a are introduced via the piping tube 562 into the first chamber 548, and they are discharged to the discharge passage 546 in accordance with the showering effected by the liquid-spouting means 556. The water content generated in the discharge tube 566 is introduced via the piping tube 568 into the discharge passage 546.

When the suction is effected from the suction port 542 in the processing chamber 414a, the external air can be introduced into the processing chamber 414a through the exterior air inflow port 540. Accordingly, the atmosphere in the processing chamber 414a can be effectively prevented from being in an excessive negative pressure state.

The centrifugal separator 580 does not arrive at a predetermined number of revolution immediately after the start of the operation. Therefore, a period exists, in which the powder flow dust 420a and the water 418 cannot be completely separated from the drainage. Accordingly, as shown in FIG. 29, the powder flow dust 420a as the solid content is discharged from the sludge discharge port 582 of the centrifugal separator 580 to the sludge recovery box 586. On the other hand, the water 418 containing the powder flow dust 420a is introduced via the switching discharge means 588 from the liquid discharge port 584 into the second tank 592.

Subsequently, the centrifugal separator supply pump (not shown) is operated. The switching discharge means 588 is operated after passage of a predetermined period of time from the start of the operation of the centrifugal separator 580. Therefore, the water 418, which is discharged from the centrifugal separator 580, is stored in the first tank 590. In the first tank 590, the level sensor 594 is used to detect the water level of the water 418 stored in the first tank 590. The first pump 596 and the second pump 598 are selectively operated, if necessary.

When the first pump 596 is operated, the water 418 in the first tank 590 is fed via the water passage 600 to the liquid-spouting means 530 which constitutes the recovery mechanism 426. Accordingly, the water 418 is spouted into the processing chamber 414a to perform the washing operation for the metal part 412 and the arm section 502 and for the recovery operation for the powder flow dust 420a floating in the processing chamber 414a. When the second pump 598 is operated, the water 418 in the first tank 590 is discharged to the outside.

On the other hand, the powder flow dust 420a, which is discharged from the centrifugal separator 580, is discharged to the sludge recovery box 586 which is arranged corresponding to the sludge discharge port 582. In this arrangement, as shown in FIG. 28, the fourth tube 578 is connected to the upper portion of the sludge recovery box 586. The powder flow dust 420a, which floats in the sludge recovery box 586, is sucked via the fourth tube 578 to the third chamber 570. In the third chamber 570, the liquid-spouting means 574 is provided so that it is disposed at the position higher than that of the connected portion of the fourth tube 578. The powder flow dust 420a is discharged to the discharge passage 546 by the aid of the water 418 spouted from the liquid-spouting means 574.

In the second embodiment, the first and third chambers 548, 570 communicate with the lower side of the processing chamber 414a via the discharge passage 546. The second chamber 550 communicates with the first and third chambers 548, 570 via the first and third tubes 558, 576. The blower 552 communicates with the second chamber 550 via the second tube 564.

Accordingly, when the blower 552 is operated, then the mist containing the powder flow dust 420a floating in the processing chamber 414a is smoothly introduced into the first and third chambers 548, 570 through the suction port 542 and the discharge passage 546, and it is decelerated. The showering is effected by using the water 418 spouted from the liquid-spouting means 556, 574. Thus, the drainage containing the powder flow dust 420a is introduced from the discharge passage 546 and the tube 579 into the centrifugal separator 580. Further, the powder flow dust 420a introduced into the second chamber 550 is decelerated in the second chamber 550. Thus, the powder flow dust 420a is returned together with the water content via the piping tube 562 to the first chamber 548, and it is discharged to the discharge passage 546 by means of the showering.

Accordingly, the following effect is obtained. That is, the powder flow dust 420a, which floats in the processing chamber 414a, can be sucked and recovered reliably and efficiently. The powder flow dust 420a does not adhere to the metal part-holding mechanism 416. The strength-enhancing treatment for the metal part 412 is continuously performed efficiently. In this arrangement, the suction port 542 is provided on the lower side of the processing chamber 414a. Therefore, the powder flow dust 420a, which tends to float, can be smoothly and reliably sucked and recovered on the lower side by the aid of the own weight and the showering in the processing chamber 414a.

Further, in the second embodiment, the third chamber 570 communicates with the sludge recovery box 586 via the fourth tube 578. The powder flow dust 420a, which floats in the sludge recovery box 586, is forcibly sucked and discharged to the third chamber 570 in accordance with the sucking action of the blower 552. Therefore, an effect is obtained in that the simple system can be used to reliably avoid the counter flow of the powder flow dust 420a floating in the sludge recovery box 586 from the sludge discharge port 582 to the centrifugal separator 580.

Figure 30:
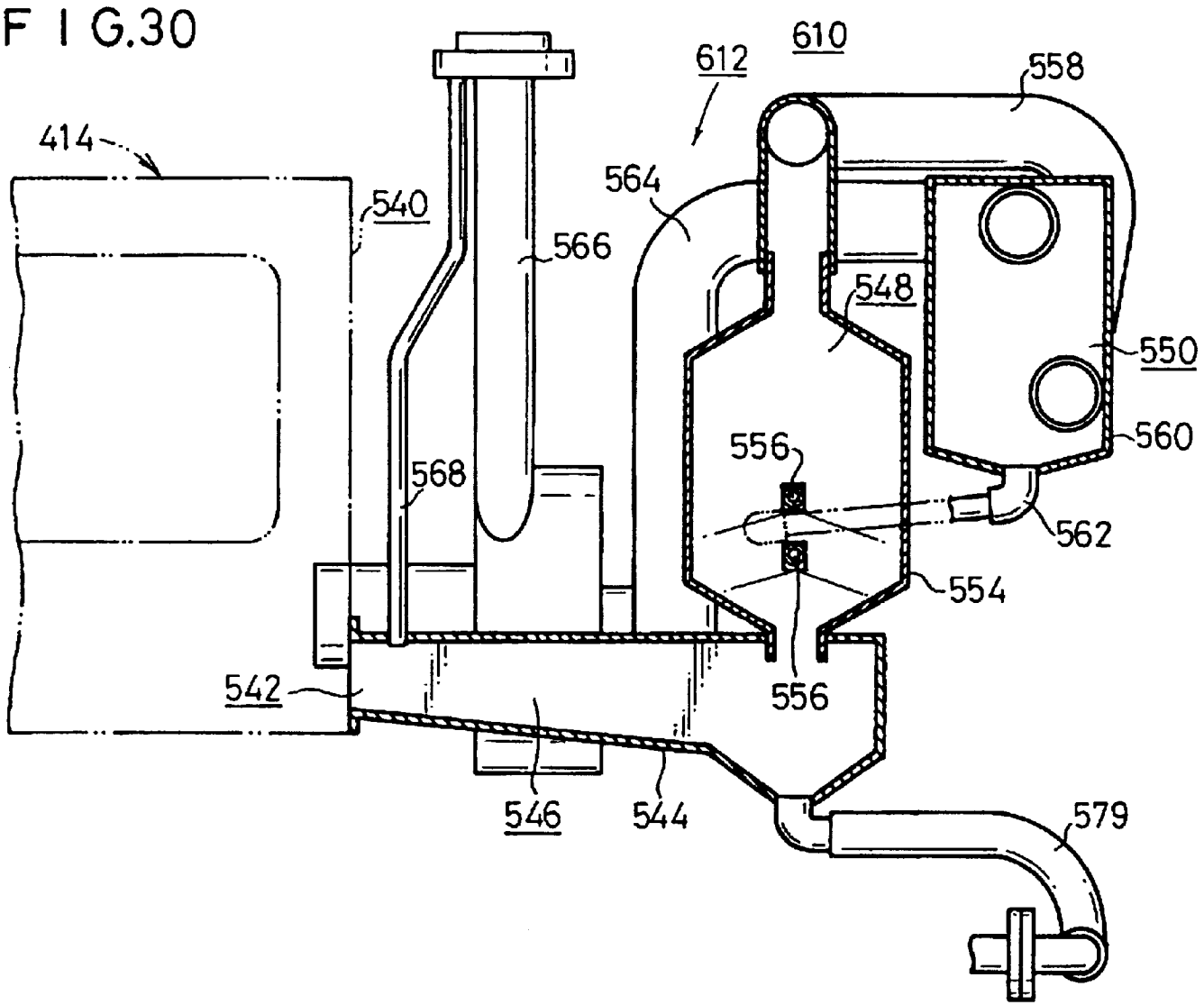
FIG. 30 shows a front view illustrating a recovery mechanism for constructing a strength-enhancing apparatus according to a third embodiment of the present invention.
Figure 31:
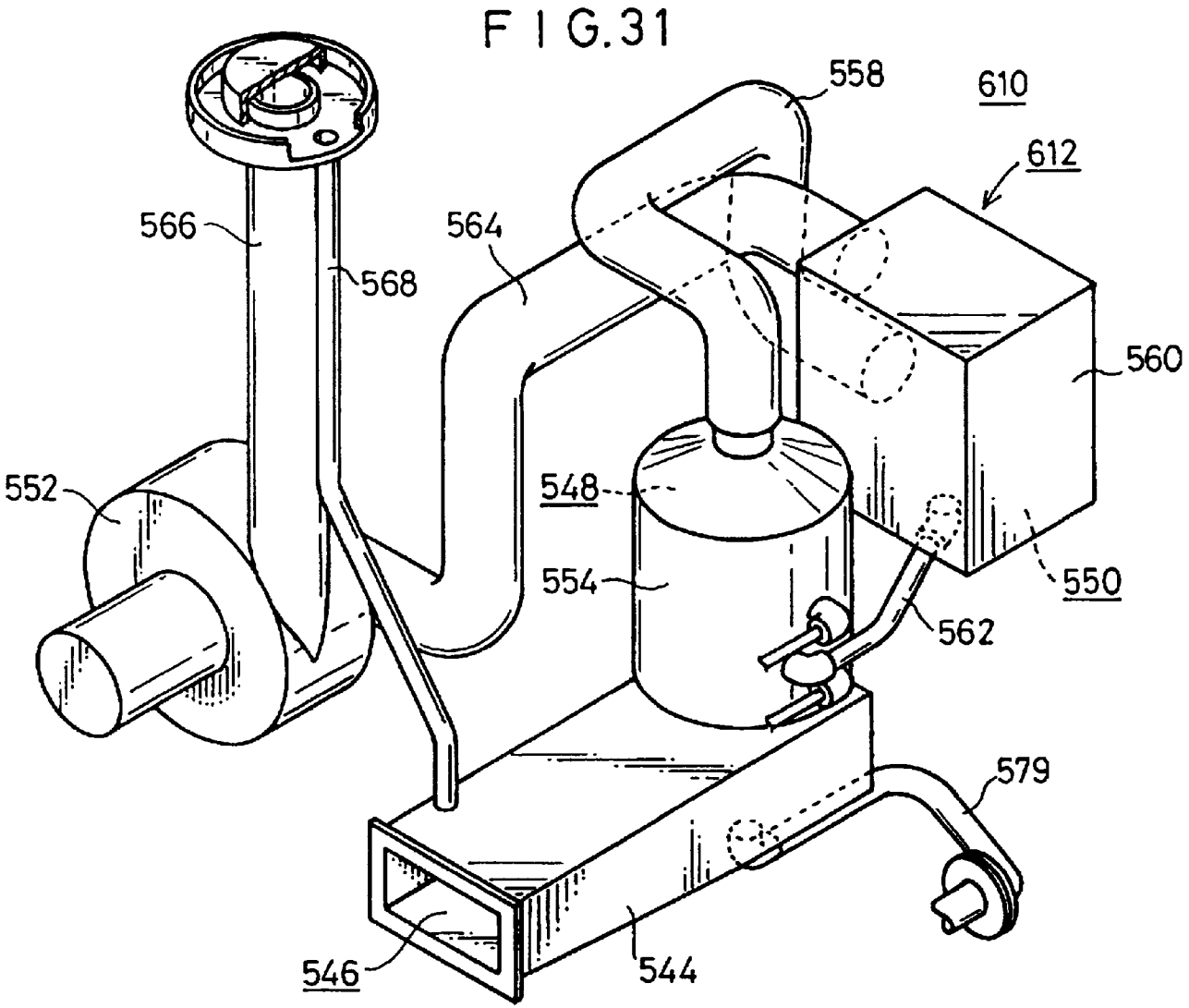
FIG. 31 shows a partial perspective view illustrating the recovery mechanism shown in FIG. 30.

FIG. 30 shows a schematic front view illustrating a recovery mechanism 612 for constructing a strength-enhancing apparatus 610 according to a third embodiment of the present invention. FIG. 31 shows a perspective view illustrating important parts of the recovery mechanism 612. The same constitutive components as those of the strength-enhancing apparatus 410 according to the second embodiment are designated by the same reference numerals, detailed explanation of which will be omitted.

In the third embodiment, only the first casing 554 for constructing the first chamber 548 is connected to the discharge passage 546. The third chamber 570, which is used in the second embodiment described above, is not used. Therefore, when the blower 552 is operated in the strength-enhancing apparatus 610, the atmosphere in the processing chamber 414a is sucked from the suction port 542 via the first and second chambers 548, 550. The powder flow dust 420a, which floats in the processing chamber 414a, is sucked via the suction port 542 and the discharge passage 546 into the first chamber 548, and it is decelerated.

In the first chamber 548, the drainage containing the powder flow dust 420a is discharged to the discharge passage 546 by the aid of the showering effected by the liquid-spouting means 556. On the other hand, the remaining powder flow dust 420a is sucked to the second chamber 550, and it is decelerated. The powder flow dust 420a is returned from the piping tube 562 to the first chamber 548. After that, the powder flow dust 420a is discharged to the discharge passage 546 by the aid of the showering. Accordingly, an effect equivalent to that obtained in the second embodiment can be obtained, for example, in that the powder flow dust 420a floating in the processing chamber 414a can be reliably recovered by using the simple system.

Figure 32:
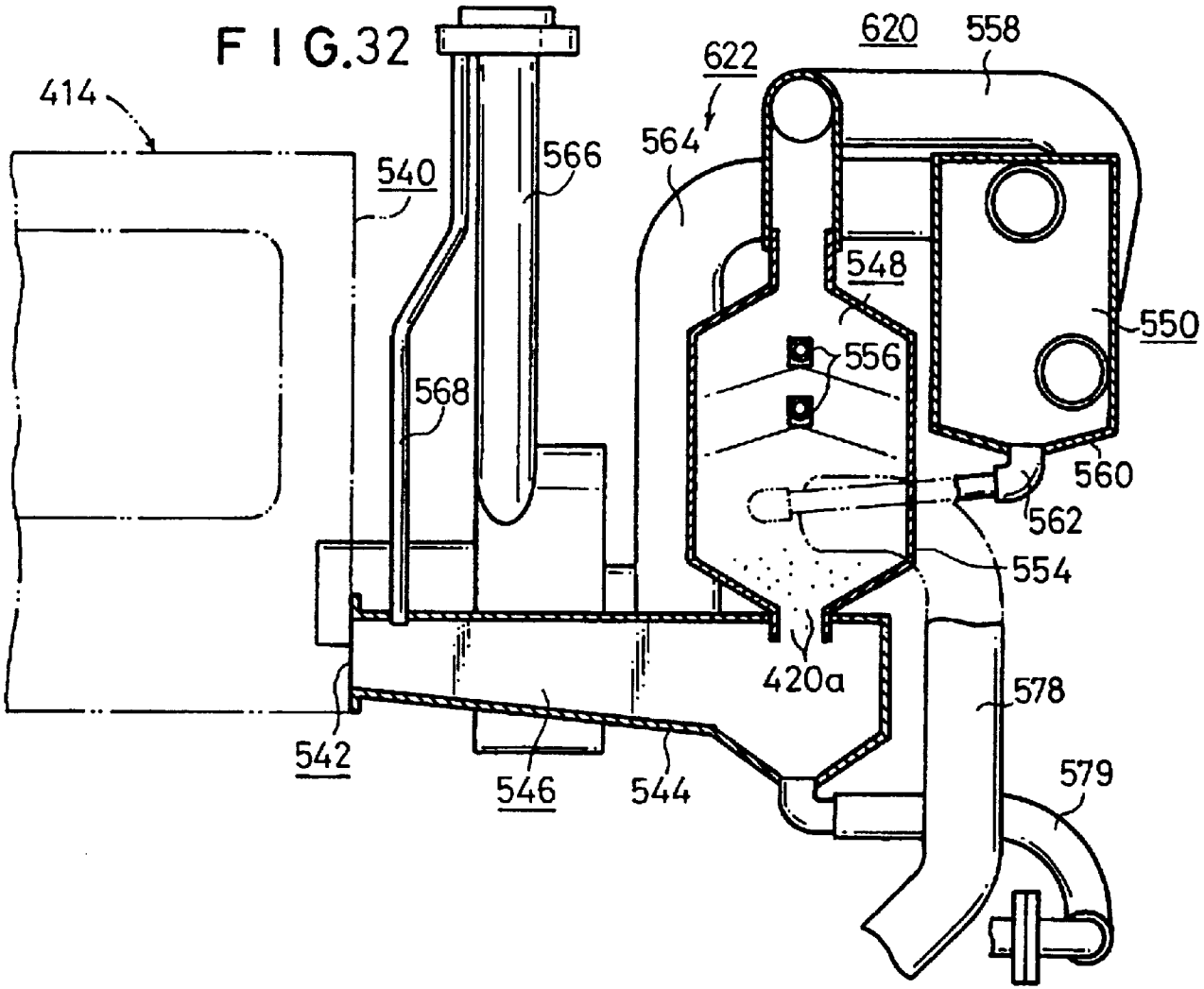
FIG. 32 shows a front view illustrating a recovery mechanism for constructing a strength-enhancing apparatus according to a fourth embodiment of the present invention.
Figure 33:
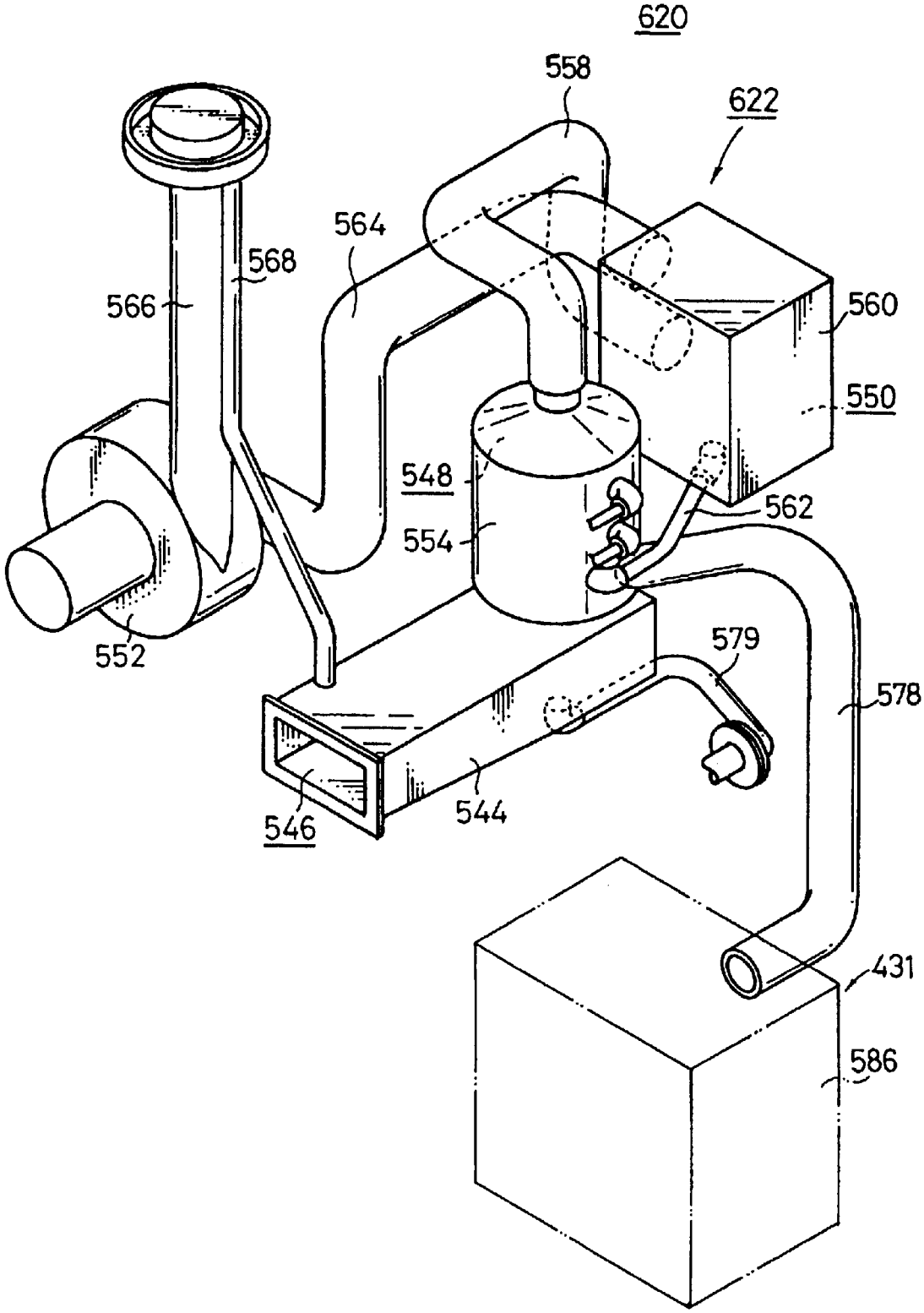
FIG. 33 shows a partial perspective view illustrating the recovery mechanism shown in FIG. 32.

FIG. 32 shows a schematic front view illustrating a recovery mechanism 622 for constructing a strength-enhancing apparatus 620 according to a fourth embodiment of the present invention. FIG. 33 shows a perspective view ilustrating important parts of the recovery mechanism 622. The same constitutive components as those of the strength-enhancing apparatus 410 according to the second embodiment are designated by the same reference numerals, detailed explanation of which will be omitted.

It the fourth embodiment, only the first casing 554 for constructing the first chamber 548 is connected to the discharge passage 546 in the same manner as in the third embodiment. The first casing 554 communicates with the sludge recovery box 586 via the fourth tube 578.

Accordingly, when the blower 552 is operated in the strength-enhancing apparatus 620, the atmosphere in the processing chamber 414a is sucked from the suction port 542 via the first and second chambers 548, 550. The powder flow dust 420a, which floats in the processing chamber 414a, is sucked via the suction port 542 and the discharge passage 546 into the first chamber 548, and it is decelerated. Further, the sludge recovery box 586 communicates with the first chamber 548 via the fourth tube 578. The powder flow dust 420a, which floats in the sludge recovery box 586, is forcibly sucked into the first chamber 548 via the fourth tube 578.

In the second to fourth embodiments of the present invention, the second chamber 550 is used. However, the blower 552 may be allowed to make direct communication with the first chamber 548 and/or the third chamber 570 without using the second chamber 550.

According to the strength-enhancing apparatus for the metal part concerning the present invention, the showering is performed for the whole interior of the processing chamber from the liquid-spouting means arranged at the wall and/or the ceiling in the processing chamber. Therefore, the liquid is spouted toward the powder flow dust floating in the processing chamber. The powder flow dust is mixed with the drainage, and it is reliably recovered. Accordingly, it is possible to effectively avoid the adhesion and the accumulation of the powder flow dust. Further, it is possible to avoid the leakage of the powder flow dust to the outside which would be otherwise caused when the door is opened/closed.

The present invention is provided with the classifying mechanism for classifying the drainage into the liquid and the powder flow dust after recovering the drainage containing the powder flow dust generated when the glass beads are crushed. Therefore, the drainage can be classified into the liquid and the powder flow dust easily and reliably to be recycled. Thus, it is easy to effectively utilize the resources.

In the present invention, the door structure, which is used to open/close the opening of the processing chamber for attaching/detaching the gear, is constructed by the double door composed of the inner slide door and the outer slide door. The inner side surface of the inner slide door is allowed to make tight contact with the outer wall of the casing which forms the processing chamber. Accordingly, it is possible to reliably avoid the leakage of the mist floating in the processing chamber to the outside, and it is possible to dissolve the problems concerning the maintenance and the environment. Further, the noise control performance is greatly improved owing to the double door structure. It is possible to effectively avoid the influence of the noise generated in the processing chamber.

Further, in the present invention, the both ends of the metal part are supported by the driving rotary section and the driven rotary section. The driven rotary section is pressed toward the metal part by the aid of the cylinder. The metal part is pressed and interposed by the driven rotary section and the driving rotary section. In this state, the spindle unit is operated, and the metal part is rotated. Accordingly, the metal part is tightly pressed and interposed at its both ends. Therefore, no deflection occurs in the metal part during the rotation. Thus, the high quality strength-enhancing treatment is performed reliably and efficiently.

In the present invention, the chamber is provided while making communication with the suction port which is open on the lower side of the processing chamber. The powder flow dust floating on the lower side in the processing chamber is sucked into the chamber in accordance with the action of the suction means. The powder flow dust is recovered by the aid of the liquid spouted from the fluid-spouting means. Accordingly, the powder flow dust floating in the processing chamber can be recovered reliably and efficiently by using the simple system. The bad influence of the powder flow dust on the strength-enhancing treatment can be avoided as less as possible. Therefore, the strength-enhancing treatment for the metal part is continuously performed highly accurately.

Further, in the present invention, the drainage containing the powder flow dust generated in the processing chamber is classified by the classifying mechanism into the powder flow dust and the liquid. After that, the classified powder flow dust is stored in the powder flow dust-accommodating unit. The powder flow dust floating in the powder flow dust-accommodating unit is forcibly sucked into the chamber via the communication passage. Accordingly, it is possible to reliably avoid any invasion of the powder flow dust floating in the powder flow dust-accommodating unit into the classifying mechanism. Further, it is possible to recover the powder flow dust floating in the processing chamber reliably and efficiently.

What is claimed is:

1. A strength-enhancing apparatus for a metal part for enhancing strength of a surface of said metal part, comprising:

a metal part-holding mechanism for positioning and holding said metal part in a processing chamber;

a projecting mechanism for projecting a spouting stream of glass beads and liquid from a nozzle toward said surface of said metal part; and a recovery mechanism for recovering powder flow dust generated from said glass beads crushed on said surface of said metal part, wherein:

said recovery mechanism includes a liquid-spouting means arranged *on* at least [at] *one of* a wall and a ceiling of said processing chamber, for effecting showering in the whole interior of said processing chamber so that said liquid is spouted toward said powder flow dust floating in said processing chamber.

2. The strength-enhancing apparatus for said metal part according to claim 1, wherein said liquid-spouting means includes a plurality of water-spouting nozzles.

3. The strength-enhancing apparatus for said metal part according to claim 1, further comprising a classifying mechanism arranged on a downstream side of said recovery mechanism, for classifying said powder flow dust and said liquid from drainage containing said powder flow dust and said liquid in a mixed manner.

4. The strength-enhancing apparatus for said metal part according to claim 1, further comprising:

a door structure for opening/closing an opening of said processing chamber for attaching/detaching said metal part, wherein said door structure includes:

an inner slide door arranged on a side of said opening;

an outer slide door arranged at the outside of said inner slide door;

a driving means for automatically moving said inner slide door back and forth in an opening or closing direction; and a pressing means for allowing an inner side surface of said inner slide door to make tight contact with an outer wall of a casing for forming said processing chamber when said inner slide door is closed by the aid of said driving means.

5. The strength-enhancing apparatus for said metal part according to claim 4, further comprising:

an engaging means for engaging said outer slide door with said inner slide door to move said outer slide door in said opening direction when said inner slide door is moved in said opening direction by the aid of said driving means; and a release means for releasing engagement between said outer slide door and said inner slide door effected by said engaging means in a state in which said outer slide door is arranged at an open position.

6. The strength-enhancing apparatus for said metal part according to claim 4, wherein said pressing means includes:

[to] a cam follower provided on said inner slide door; and a cam member provided on said casing, for making contact with said cam follower to retract said inner slide door toward said opening.

7. The strength-enhancing apparatus for said metal part according to claim 1, wherein said metal part-holding mechanism includes:

a spindle unit provided with a driving rotary section for making rotation while supporting a first end of said metal part;

a support means provided with a driven rotary section which is movable while supporting a second end of said metal part; and a cylinder for pressing said driven rotary section toward said second end of said metal part to interpose said metal part by using said driven rotary section and said driving rotary section.

8. The strength-enhancing apparatus for said metal part according to claim 7, further comprising:

a position-adjusting means capable of adjusting positions of said support means and said cylinder in an integrated manner in an axial direction of said metal part, wherein said position-adjusting means includes:

a guide member arranged in said processing chamber;

a sleeve member slidably inserted into the inside of said guide member, for installing said support means and said cylinder thereto; and a movement means for moving said sleeve member back and forth in said axial direction.

9. The strength-enhancing apparatus for a metal part for enhancing strength of a surface of said metal part, comprising:

a metal part-holding mechanism for positioning and holding said metal part in a processing chamber;

a projecting mechanism for projecting a spouting stream of glass beads and liquid from a nozzle toward said surface of said metal part;

a recovery mechanism for recovering powder flow dust generated from said glass beads crushed on said surface of said metal part together with drainage; and a classifying mechanism for classifying said recovered drainage into said liquid and said powder flow dust.

10. The strength-enhancing apparatus for said metal part according to claim 9, wherein said classifying mechanism includes:

first and second tanks for storing said classified liquid; and a switching discharge means for selectively discharging said classified liquid to said first tank and said second tank.

11. The strength-enhancing apparatus for said metal part according to claim 10, wherein one of said first and second tanks is a tank for storing said liquid from which said powder flow dust is removed, and the other is a tank for storing impure liquid containing said powder flow dust in a mixed manner.

12. The strength-enhancing apparatus for said metal part according to claim 11, further comprising a supply mechanism for supplying said liquid in said liquid-storing tank to said recovery mechanism.

13. The strength-enhancing apparatus for said metal part according to claim 9, further comprising:

a door structure for opening/closing an opening of said processing chamber for attaching/detaching said metal part, wherein said door structure includes:

an inner slide door arranged on a side of said opening;

an outer slide door arranged at the outside of said inner slide door;

a driving means for automatically moving said inner slide door back and forth in an opening or closing direction; and a pressing means for allowing an inner side surface of said inner slide door to make tight contact with an outer wall of a casing for forming said processing chamber when said inner slide door is closed by the aid of said driving means.

14. The strength-enhancing apparatus for said metal part according to claim 13, further comprising:

an engaging means for engaging said outer slide door with said inner slide door to move said outer slide door in said opening direction when said inner slide door is moved in said opening direction by the aid of said driving means; and a release means for releasing engagement between said outer slide door and said inner slide door effected by said engaging means in a state in which said outer slide door is arranged at an open position.

15. The strength-enhancing apparatus for said metal part according to claim 13, wherein said pressing means includes:

a cam follower provided on said inner slide door; and a cam member provided on said casing, for making contact with said cam follower to retract said inner slide door toward said opening.

16. The strength-enhancing apparatus for said metal part according to claim 9, wherein said metal part-holding mechanism includes:

a spindle unit provided with a driving rotary section for making rotation while supporting a first end of said metal part;

a support means provided with a driven rotary section which is movable while supporting a second end of said metal part; and a cylinder for pressing said driven rotary section toward said second end of said metal part to interpose said metal part by using said driven rotary section and said driving rotary section.

17. The strength-enhancing apparatus for said metal part according to claim 16, further comprising:

a position-adjusting means capable of adjusting positions of said support means and said cylinder in an integrated manner in an axial direction of said metal part, wherein said position-adjusting means includes:

a guide member arranged in said processing chamber;

a sleeve member slidably inserted into the inside of said guide member, for installing said support means and said cylinder thereto; and a movement means for moving said sleeve member back and forth in said axial direction.

18. A strength-enhancing apparatus for a metal part for enhancing strength of a surface of said metal part, comprising:

a metal part-holding mechanism for positioning and holding said metal part in a processing chamber;

a projecting mechanism for projecting a spouting stream of glass beads and liquid from a nozzle toward said surface of said metal part; and a recovery mechanism for recovering powder flow dust generated from said glass beads crushed on said surface of said metal part together with drainage, wherein said recovery mechanism includes:

an external air inflow port capable of introducing external air into said processing chamber;

a suction port which is open on a lower side in said processing chamber;

a chamber arranged in a discharge passage formed in communication with said suction port;

a suction means communicating with said chamber, for sucking said powder flow dust in said processing chamber from said suction port into said chamber; and a liquid-spouting means for spouting said liquid toward said powder flow dust introduced into said chamber.

19. The strength-enhancing apparatus for said metal part according to claim 18, wherein a classifying mechanism for classifying said recovered drainage into said liquid and said powder flow dust is arranged on a downstream side of said recovery mechanism.

20. The strength-enhancing apparatus for said metal part according to claim 18, wherein said chamber includes:

a first chamber communicating with said discharge passage, for accommodating said liquid-spouting means; and a second chamber communicating with a downstream side of said first chamber and communicating with said suction means.

21. The strength-enhancing apparatus for said metal part according to claim 20, wherein a classifying mechanism for classifying said recovered drainage into said liquid and said powder flow dust is arranged on a downstream side of said recovery mechanism.

22. A strength-enhancing apparatus for a metal part for enhancing strength of a surface of said metal part, comprising:

a metal part-holding mechanism for positioning and holding said metal part in a processing chamber;

a projecting mechanism for projecting a spouting stream of glass beads and liquid from a nozzle toward said surface of said metal part;

a recovery mechanism for recovering powder flow dust generated from said glass beads crushed on said surface of said metal part together with drainage;

a classifying mechanism arranged on a downstream side of said recovery mechanism, for classifying said recovered drainage into said powder flow dust and said liquid; and a powder flow dust-accommodating unit for storing said powder flow dust, wherein said recovery mechanism includes:

an external air inflow port capable of introducing external air into said processing chamber;

a suction port which is open in said processing chamber;

a chamber arranged in a discharge passage formed in communication with said suction port;

a communication passage for making communication between said powder flow dust-accommodating unit and said chamber;

a suction means communicating with said chamber, for sucking said powder flow dust floating in said processing chamber and said powder flow dust-accommodating unit into said chamber; and a liquid-spouting means for spouting said liquid toward said powder flow dust introduced into said chamber.

23. The strength-enhancing apparatus for said metal part according to claim 22, wherein said chamber includes:

a first chamber communicating with said discharge passage and said communication passage, for accommodating said liquid-spouting means; and a second chamber communicating with a downstream side of said first chamber and communicating with said suction means.

24. The strength-enhancing apparatus for said metal part according to claim 22, wherein said chamber includes:

a first chamber communicating with said discharge passage, for accommodating said liquid-spouting means; and a second chamber communicating with a downstream side of said first chamber and communicating with said suction means; and a third chamber communicating with upstream sides of said first and second chambers, for accommodating said liquid-spouting means, while communicating with said discharge passage and said communication passage.

25. A strength-enhancing apparatus for a metal part for enhancing strength of a surface of said metal part, comprising:

a door structure for opening/closing an opening of said processing chamber for attaching/detaching said metal part, wherein said door structure includes:

an inner slide door arranged on a side of said opening; an outer slide door arranged at the outside of said inner slide door;

a driving means for automatically moving said inner slide door back and forth in an opening or closing direction; and a pressing means for allowing an inner side surface of said inner slide door to make tight contact with an outer wall of a casing for forming said processing chamber when said inner slide door is closed by the aid of said driving means.

26. The strength-enhancing apparatus for said metal part according to claim 25, further comprising:

an engaging means for engaging said outer slide door with said inner slide door to move said outer slide door in said opening direction when said inner slide door is moved in said opening direction by the aid of said driving means; and a release means for releasing engagement between said outer slide door and said inner slide door effected by said engaging means in a state in which said outer slide door is arranged at an open position.

27. The strength-enhancing apparatus for said metal part according to claim 25, wherein said pressing means includes:

a cam follower provided on said inner slide door; and a cam member provided on said casing, for making contact with said cam follower to retract said inner slide door toward said opening.

28. A strength-enhancing apparatus for a metal part for enhancing strength of a surface and said metal part, comprising:

a metal part-holding mechanism for positioning and holding said metal part in a processing chamber, wherein said metal part-holding mechanism includes:

a spindle unit provided with a driving rotary section for making rotation while supporting a first end of said metal part;

a support means provided with a driven rotary section which is movable while supporting a second end of said metal part; and a cylinder for pressing said driven rotary section toward said second end of said metal part to interpose said metal part by using said driven rotary section and said driving rotary section.

29. The strength-enhancing apparatus for said metal part according to claim 28, further comprising:

a position-adjusting means capable of adjusting positions of said support means and said cylinder in an integrated manner in an axial direction of said metal part, wherein said position-adjusting means includes:

a guide member arranged in said processing chamber;

a sleeve member slidably inserted into the inside of said guide member, for installing said support means and said cylinder thereto; and a movement means for moving said sleeve member back and forth in said axial direction.

* * * * *